(12) United States Patent
Hosea

(10) Patent No.: US 10,306,208 B2
(45) Date of Patent: *May 28, 2019

(54) DEVICE FOR CREATING AND ENHANCING THREE-DIMENSIONAL IMAGE EFFECTS

(71) Applicant: Harold O. Hosea, West Chester, OH (US)

(72) Inventor: Harold O. Hosea, West Chester, OH (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/528,523

(22) PCT Filed: Nov. 23, 2015

(86) PCT No.: PCT/US2015/062138
§ 371 (c)(1),
(2) Date: May 22, 2017

(87) PCT Pub. No.: WO2016/085851
PCT Pub. Date: Jun. 2, 2016

(65) Prior Publication Data
US 2017/0272725 A1    Sep. 21, 2017

Related U.S. Application Data

(63) Continuation-in-part of application No. 14/533,140, filed on Nov. 5, 2014, now Pat. No. 9,671,006.

(51) Int. Cl.
*H04N 13/218*    (2018.01)
*G03B 35/10*    (2006.01)
(Continued)

(52) U.S. Cl.
CPC .............. *H04N 13/218* (2018.05); *F16H 7/06* (2013.01); *F16H 9/26* (2013.01); *F16H 55/06* (2013.01);
(Continued)

(58) Field of Classification Search
None
See application file for complete search history.

(56) References Cited

U.S. PATENT DOCUMENTS 862,354 A    8/1907  Stevens
1,532,236 A    4/1925  Douglass
(Continued)

FOREIGN PATENT DOCUMENTS

WO    WO 2016085851    6/2016

OTHER PUBLICATIONS

R. Magnus, "Goethe as a Scientist" (Heny Schuman, New York, 194), pp. 136-19, 174-177.
(Continued)

*Primary Examiner* — Eileen M Adams
(74) *Attorney, Agent, or Firm* — Eric W. Guttag; Eric W. Guttag IP Law Office

(57) ABSTRACT

A device for creating more natural three-dimensional image effects which may be recorded, for example, by video cameras. The device has an intermittent image pathway occluder for receiving at least two image pathways which alternately and intermittently occludes the two image pathways, a horizontal imaging-shifting component for shifting at least one of the image pathways leftward or rightward, a vertical imaging-shifting component for shifting the image pathways upward and downward, and an image pathway compositing component which forms a coincident superimposed composite three-dimensional image after the image pathways have been shifted by the horizontal and vertical imaging-shifting components, and after passing through the intermittent image pathway occluder. Also, a device for enhancing the more natural three-dimensional effect of such images which are created and which may be recorded and/or displayed.

27 Claims, 11 Drawing Sheets

(51) Int. Cl.

| | |
|---|---|
| *H04N 13/189* | (2018.01) |
| *F16H 57/12* | (2006.01) |
| *F16H 7/06* | (2006.01) |
| *F16H 9/26* | (2006.01) |
| *F16H 55/06* | (2006.01) |
| *F16H 55/30* | (2006.01) |
| *F16H 55/56* | (2006.01) |
| *F16H 57/021* | (2012.01) |

(52) U.S. Cl.
CPC .......... *F16H 55/30* (2013.01); *F16H 55/566* (2013.01); *F16H 57/021* (2013.01); *F16H 57/12* (2013.01); *G03B 35/10* (2013.01); *H04N 13/189* (2018.05)

(56) References Cited

U.S. PATENT DOCUMENTS

| | | | |
|---|---|---|---|
| 1,655,850 A | 1/1928 | Watts | |
| 2,106,752 A | 2/1938 | Land | |
| 2,168,273 A | 8/1939 | Sauer et al. | |
| 2,216,960 A | 10/1940 | Pistor et al. | |
| 2,258,903 A | 10/1941 | Mitchell | |
| 2,326,951 A | 8/1943 | Kober et al. | |
| 2,413,808 A | 1/1947 | Williams | |
| 3,990,087 A | 11/1976 | Marks et al. | |
| 4,178,090 A | 12/1979 | Marks et al. | |
| 4,525,045 A | 6/1985 | Fazekas | |
| 4,674,837 A | 6/1987 | Knuttel et al. | |
| 4,779,972 A | 10/1988 | Gottlieb | |
| 5,349,403 A | 9/1994 | Lo | |
| 5,532,777 A | 7/1996 | Zanen | |
| 6,271,918 B2 | 8/2001 | Blais | |
| 6,603,504 B1 | 8/2003 | Son et al. | |
| 6,643,396 B1 | 11/2003 | Hendriks | |
| 6,801,597 B2 | 10/2004 | Webber | |
| 6,819,488 B2 | 11/2004 | Zanen | |
| 7,545,429 B2 | 6/2009 | Travis | |
| 8,179,424 B2 | 5/2012 | Moller | |
| 8,355,019 B2 | 1/2013 | Eichenlaub | |
| 8,514,268 B2 | 8/2013 | Gharib et al. | |
| 9,565,421 B2 * | 2/2017 | Hosea | G03B 35/10 |
| 2002/0131170 A1 * | 9/2002 | Costales | G02B 21/22 359/464 |
| 2009/0303587 A1 * | 12/2009 | Lo | G02B 27/2242 359/473 |
| 2011/0141241 A1 | 6/2011 | Lee et al. | |
| 2011/0170849 A1 | 7/2011 | Chang | |
| 2012/0212592 A1 * | 8/2012 | Breidenthal | H04N 13/239 348/54 |
| 2014/0049636 A1 * | 2/2014 | O'Donnell | G08C 17/02 348/143 |

OTHER PUBLICATIONS

International Search Report (dated Feb. 12, 2016) for PCT/US2015/62138, 2 pages.
Written Opinion of the International Search Authority (dated Feb. 12, 2016) for PCT/US2015/62138, 8 pages.

* cited by examiner

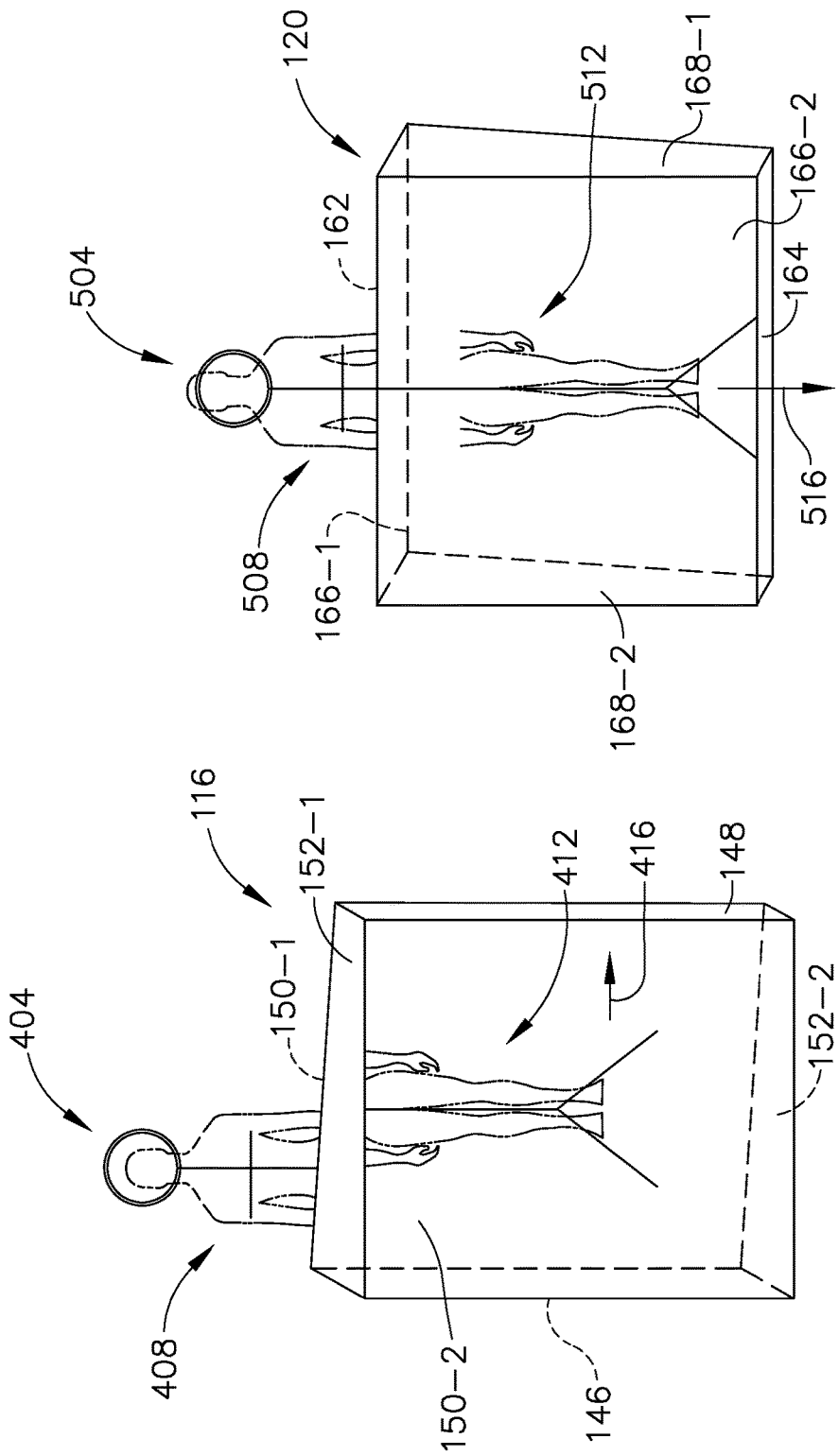

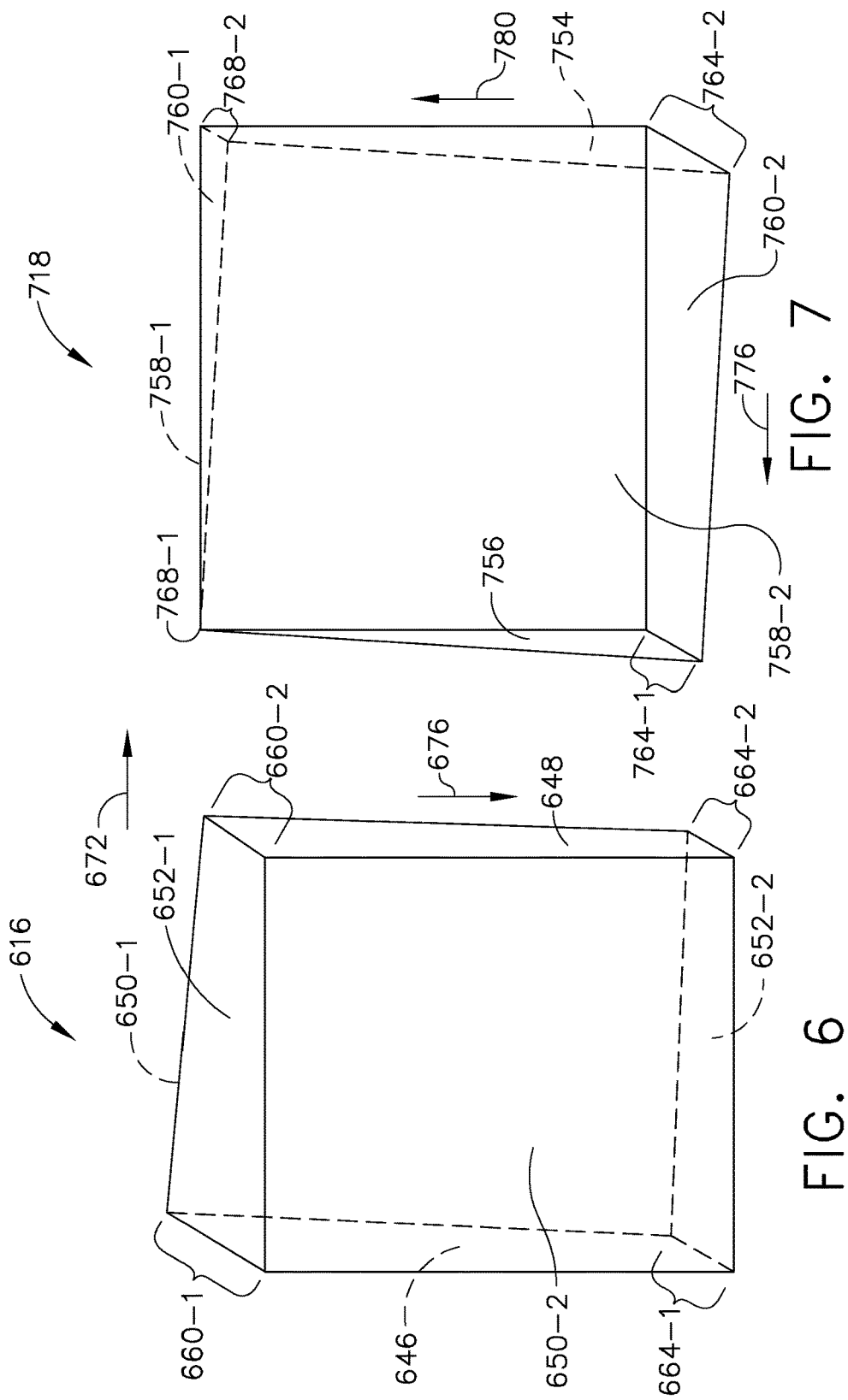

DEVICE FOR CREATING AND ENHANCING THREE-DIMENSIONAL IMAGE EFFECTS

CROSS-REFERENCE TO RELATED APPLICATIONS

This application is a national stage application of PCT Application Ser. No. PCT/US15/062138, files Nov. 23, 2015 which is a continuation-in-part of, which makes reference to, and which claims the priority benefit of U.S. patent application Ser. No. 14/553,140, filed Nov. 25, 2014. , now U.S. Pat. No. 9,565,421, issued Feb. 7, 2017. The entire disclosure and contents of the foregoing PCT and U.S. Pat Applications are hereby incorporated by reference.

FIELD OF THE INVENTION

The present invention broadly relates to a device for creating more natural three-dimensional image effects which may be recorded and/or displayed, for example, by video/digital equipment such as video cameras. The present invention also broadly relates to a device for enhancing the more natural three-dimensional effect of such images which are created, and which may be recorded and/or displayed.

BACKGROUND

Stereoscopy (also called stereoscopics or three-dimensional (3D) imaging) is a technique for creating or enhancing the illusion of depth in an image by means of stereopsis for binocular vision. Originally, stereograms created by such techniques involved a pair of stereo images which could be viewed using a stereoscope. Most stereoscopic methods present two offset images separately to the left and right eye of the viewer. These two-dimensional images may then be combined in the brain to give the perception of three-dimensional depth. In other words, stereoscopy creates the illusion of three-dimensional depth from using two-dimensional images. Stereoscopy may thus be distinguished from three-dimensional displays that display an image in three full dimensions, allowing the observer to increase information about the 3-dimensional objects being displayed by head and eye movements.

To create the illusion of a three-dimensional effect, another method employs a binocular imaging technique, for example, with two cameras disposed eye distance apart. With this method, the three-dimensional impression gained by the observer may be produced by the fact that the two imaging channels work in different colors, with the observer wearing special glasses, of which one glass is tinted in one color, while the other glass is tinted with a different color. Similar techniques may use polarized light and suitably polarized glasses. Although this kind of three-dimensional imaging exhibits higher information content, it does not go beyond the sum of the information content of two two-dimensional images received from the two imaging elements. Again, the observer is offered merely a three-dimensional impression corresponding to that gained by an observer who is fixed in relation to an actual three-dimensional object.

Another method for producing images with a three-dimensional effect is based on holography. In this method, a three-dimensional object is illuminated by a viewing beam, such as a laser beam, with the light reflected by the object being mixed with a reference beam, also often generated by a laser beam. The resulting interference pattern of the two beams may be stored as a holographic recording so that, with suitable lighting, the developed holographic recording may be recovered and projected to provide images having a three-dimensional impression. With holographic imaging, the three-dimensional impression may be more complete because, due to the holographic recording technique, the observer may be able to go "round the object" since the surface of the imaged object appears to hover freely in space.

Three-dimensional effects may also be creating in moving images. A three-dimensional (3D) film or stereoscopic three-dimensional (S3D) film involves a motion picture that enhances the illusion of three-dimensional depth perception. Derived from stereoscopic photography, a regular motion picture camera system may be used to record images as seen from two perspectives, or computer-generated imagery may be used to generate the two perspectives in post-production to create the film as a series of moving images. Special projection hardware and/or eyewear may then be used to provide the illusion of three-dimensional depth when viewing the film. In addition to being used in theatrical film releases, television broadcasts and direct-to-video films may also incorporate similar methods such as in the case of three-dimensional (3D) television and Blu-ray three-dimensional (3D) video.

SUMMARY

According to a first broad aspect of the present invention, there is provided a device for at least creating three-dimensional image effects and which receives an image as two separate image pathways spaced apart along a horizontal axis, the device comprising:
  an intermittent image pathway occluder which receives the two image pathways, and which alternately and intermittently occludes the two image pathways;
  a horizontal imaging-shifting component for shifting at least one of the two image pathways leftward or rightward along a horizontal axis, and a comprising at least one horizontal image-shifting element which is positioned to receive and shift at least one of the two image pathways leftward or rightward;
  a vertical imaging-shifting component for shifting the two image pathways upward and downward along a vertical axis, and comprising an upward image-shifting element and a downward image-shifting element, wherein the upward image-shifting element is positioned to receive and shift one of the two image pathways upward and wherein the downward image-shifting element is positioned to receive and shift the other of the two image pathways downward; and
  an image pathway compositing component which forms a coincident superimposed composite three-dimensional image after the two image pathways have been shifted by the horizontal imaging-shifting component and the vertical imaging-shifting component, and after the two image pathways have been alternately and intermittently occluded by the intermittent image pathway occluder.

According to a second broad aspect of the present invention, there is provided an device for creating and enhancing three-dimensional image effects and which receives an image as two separate image pathways spaced apart along a horizontal axis, the device comprising:
  an intermittent optical image pathway occluder which receives the two image pathways, and which alternately and intermittently occludes passage of the two image pathways therethrough;

a first set of optical elements for shifting the two image pathways leftward and rightward along a horizontal optical axis after passing through the intermittent optical image pathway occluder, and comprising a leftward image-shifting optical element and rightward image-shifting optical element, wherein the leftward image-shifting optical element is positioned to receive and shift one of the two image pathways horizontally towards the left, and wherein the rightward image-shifting optical element is positioned to receive and shift the other of the two image pathways towards the right;

a second set of optical elements for shifting the two image pathways upward and downward along a vertical optical axis after passing through the intermittent optical image pathway occluder, and comprising an upward image-shifting optical element and downward image-shifting optical element, wherein the upward image-shifting optical element is positioned to receive and shift one of the two image pathways upward and wherein the downward image-shifting optical element is positioned to receive and shift the other of the two image pathways downward;

an angularly adjustable coincidence mirror positioned to receive one of the two image pathways after the image pathways are shifted by the first or second set of optical elements and having a forward reflective surface;

an angularly adjustable transmissive and reflective coincidence glass plate having a forward transmissive surface and a rearward reflective surface, and which is positioned so that the transmissive surface receives and passes the other of the two image pathways through the glass plate after the other image pathway is shifted by the first or second set of optical elements;

wherein the mirror and glass plate are angularly adjustable such that the forward reflective surface and the rearward reflective surface can be substantially parallel, and wherein when the forward and rearward reflective surfaces are substantially parallel, the image pathway received by the mirror is reflected by the forward reflective surface thereof towards the rearward reflective surface of the glass plate so as to form a coincident superimposed composite three-dimensional image from the image pathway reflected by the forward reflective surface and the image pathway passing through the glass plate.

According to a third broad aspect of the present invention, there is provided a device for at least creating three-dimensional image effects and which receives an image as at least three separate image pathways, the device comprising:

a first set of optical elements for shifting a first and/or second of the at least three image pathways leftward and/or rightward along a horizontal optical axis, and comprising a leftward image-shifting optical element and/or rightward image-shifting optical element, wherein the leftward image-shifting optical element is positioned to receive and shift the first image pathway leftward, and wherein the rightward image-shifting optical element is positioned to receive and shift the second image pathway rightward;

a second set of optical elements for shifting a third and fourth of the at least three image pathways upward and downward along a vertical optical axis, and comprising an upward image-shifting optical element and a downward image-shifting optical element, wherein the upward image-shifting optical element is positioned to receive and shift the third image pathway upward and wherein the downward image-shifting optical element is positioned to receive and shift the fourth image pathway downward;

at least one electronic image receptor component which is positioned to receive each of the shifted image pathways such that the at least one electronic image receptor component operates to alternately and intermittently occlude receipt of the third and fourth shifted image pathways, and, when receiving both the first and second shifted image pathways, operates to and alternately and intermittently occlude receipt of the first and second shifted image pathways; and an image pathway compositing component which forms a coincident superimposed composite three-dimensional image from the received first and/or second shifted image pathways, and the received third and fourth shifted image pathways.

BRIEF DESCRIPTION OF THE DRAWINGS

The invention will be described in conjunction with the accompanying drawings, in which:

FIG. 4 is a perspective view of an embodiment of an optical wedge shown in FIGS. 1 and 3 which is oriented to cause a rightward shift of an image passing therethrough;

FIG. 5 is a perspective view of the optical wedge shown in FIG. 4 but which is instead oriented to cause a downward shift of an image passing therethrough;

FIG. 6 is a perspective view of an embodiment of a compound optical wedge which is oriented/configured to cause both a rightward and a downward shift of an image/image path/image pathway passing therethrough;

FIG. 7 is a perspective view of another embodiment of a compound optical wedge which is instead oriented/configured to cause both a leftward and upward shift of an image/image path/image pathway passing therethrough;

DETAILED DESCRIPTION

Figure 1:
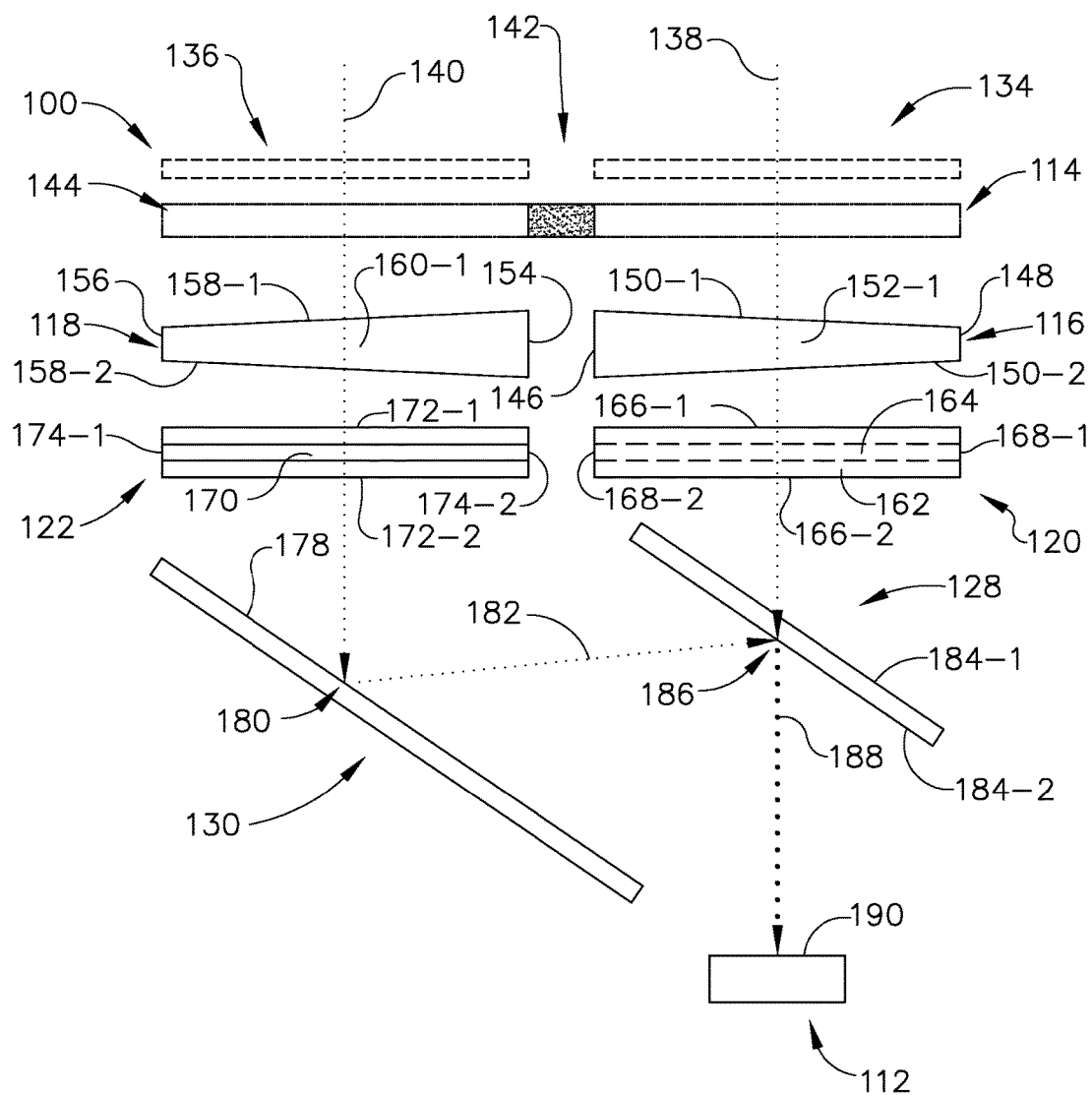
FIG. 1 is a schematic diagram of an embodiment of the device of the present invention.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "outer," "inner," "upper," "lower," "top," "bottom," "side," "front," "frontal," "forward," "rear," "rearward," "back," "trailing," "above," "below," "leftward," "rightward," "horizontal," "vertical," "upward," "downward," "underside," "outside," "outer," etc., are merely used for convenience in describing the various embodiments of the present invention. For example, the embodiments shown in FIGS. 1 through 15 may be flipped over, rotated by 90° or 180° in any direction, etc.

For the purposes of the present invention, the term "device" may be used interchangeably herein with the terms machine, equipment, apparatus, etc., and may refer in various contexts to one device, a plurality of devices, the entire device(s), a portion of the device(s), a component of the device(s), an element of the device(s), etc.

For the purposes of the present invention, the term "three-dimensional effect" refers to the creation of a composite image having the appearance of being in three dimensions which is formed from images being shifted in at least one of the leftward and rightward (horizontal) directions, as well as from images shifted in each of the upward and downward (vertical) directions, wherein at least the vertically shifted images have also been alternately and intermittently occluded before forming the composite image.

For the purposes of the present invention, the term "enhanced three-dimensional effect" refers to a three-dimensional effect which has been enhanced by forming a composite image from images which have been shifted in both the leftward and rightward (horizontal) directions, as well as from images which have been shifted in each of the upward and downward (vertical) directions, each respective pair of horizontally shifted images and vertically shifted images having also been alternately and intermittently occluded before forming the composite image.

For the purposes of the present invention, the term "image" refers to a visual picture, representation, perception, depiction, recordation, etc., of one or more subjects, objects, persons, things, scenes, etc., and may refer in various contexts to one image, a plurality of images, the entire image(s), a portion of the image(s), etc.

For the purposes of the present invention, the term "image area" (which may also be called interchangeably the "image box," "viewing area/box," or "sight area/box") refers to a distinct two-dimensional (e.g., rectangular) area, zone, section, region, etc., having horizontal and vertical dimensions though which an image(s) or portion of an image(s) passes.

For the purposes of the present invention, the term "image path" refers to a portion, segment, etc., of the image pathway which passes through a given image area.

For the purposes of the present invention, the term "image pathway" refers collectively to a plurality of image paths which pass through a given image area and which comprise, make up, etc., the composite (combined, collected, etc.) portion, segment, etc., of the image(s) or portion of the image(s) which passes through that given image area.

For the purposes of the present invention, the term "image-shifting" refers to optical shifting of an image(s), image path(s), image pathway(s), etc., or portion(s) thereof, horizontally (i.e., in the leftward or rightward direction), vertically (i.e., in the upward or downward direction), or both horizontally and vertically.

For the purposes of the present invention, the term "occluder" refers to a device, component, element, etc., which optically blocks, turns off, interrupts, etc., the passage, receipt, etc., of an image, image path, image pathway, etc.

For the purposes of the present invention, the term "intermittently interrupt" refers to temporarily (and alternately) blocking, turning off, interrupting, etc., the passage, receipt, etc., of an image, image path, image pathway, etc.

For the purposes of the present invention, the term "intermittent occluder" refers to an occluder, which blocks and opens, turns on and off, etc., temporarily and alternately the passage, receipt, etc., of images, image paths, image pathways, etc.

For the purposes of the present invention, the term "electronic occluder" refers to an occluder which electronically blocks and opens, i.e., by intermittently turning on and off, etc., the passage, receipt, etc., of images, image paths, image pathways, etc. Electronic occluders may include, for example, electronic image receptor components such as image sensors, image scanners, video camera tubes, etc.

For the purposes of the present invention, the term "electronic image receptor component" refers to one or more electronic elements which may receive, record, etc., images. Electronic image receptor components may include image sensors, image scanners, video camera tubes, etc., as well as any image recording device, such as a video camera, etc., which includes such image sensors, image scanners, video camera tubes, etc. In embodiments of the device of the present invention, the electronic image receptor component and the image pathway compositing component may be separate components or may be the same component.

For the purposes of the present invention, the term "image sensor" refers to a device that converts an optical image into an electronic signal. Image sensors may include one or more of: charge-coupled device (CCD) sensors; active-pixel sensors (APS) (including complementary metal-oxide semiconductor (CMOS) sensors); etc.

For the purposes of the present invention, the term "image scanner" refers to a device which optically scans images, and converts those scanned images to a digital image. Image scanners may include one or more of: charge-coupled device (CCD) scanners; contact image sensors (CIS); etc.

For the purposes of the present invention, the term "video camera tube" refers to an analog device in the form of a type of cathode ray tube used to capture images. Video camera tubes may include one or more of: image dissectors; vidicon tubes; etc.

For the purposes of the present invention, the term "active-pixel sensor (APS)" refers to an image sensor which comprises an integrated circuit containing an array of pixel sensors, each pixel sensor containing a photodetector and an active amplifier.

For the purposes of the present invention, the term "image-shifting element" refers to an element which optically shifts (deflects) an image, image path, image pathway, etc., in one or both of the horizontal direction(s) or vertical direction(s). Image-shifting elements may be static optical elements (e.g., optical wedges), electronic elements which the same or similar to static optical elements, etc.

For the purposes of the present invention, the term "optical element" refers to a physical element which optically affects, changes, reflects, refracts, etc., the passage of light, images, etc.

For the purposes of the present invention, the term "optical wedge" refers to a optically transparent image-shifting element having a pair of opposed transparent input and output faces which are angled (e.g., inwardly slanted) to cause optical shifting (deflection) of images, image paths, image pathways, etc., that pass through the wedge from the input to the output face. The angle formed by the opposed input and output faces of an optical wedge may, for example, be in the range of from about 0.5 to about 5 degrees, such as from about 1 to about 3 degrees. Optical wedges may have a triangular shaped cross-section, trapezoidal cross-section, etc.

For the purposes of the present invention, the term "input face" refers to the face of the optical wedge that first receives an image(s), image path(s), image pathway, etc.

For the purposes of the present invention, the term "output face" refers to the face of the optical wedge that the shifted (deflected) image(s), image path(s), image pathway, etc., passes out of For the purposes of the present invention, the term "apex" refers to the thinner edge or side of an optical wedge which is opposite the base and which the input and output faces are connected to.

For the purposes of the present invention, the term "base" refers to the thicker edge or face of an optical wedge which is opposite the apex and which the input and output faces are connected to and extend from to the apex.

For the purposes of the present invention, the term "trapezoidal" refers to a shape having two parallel edges and two non-parallel edges, such as, for example, the cross-section of an optical wedge.

For the purposes of the present invention, the term "compound optical wedge" refers to a single optical wedge which has input and output faces which may optically shift (deflect) an image, image path, image pathway, etc., in both a horizontal (i.e., leftward or rightward) direction, as well as a vertical (i.e., upward or downward) direction that pass from the input face to the output face.

For the purposes of the present invention, the term "image pathway compositing component" refers to one or more mechanical and/or electronic elements which form the coincident superimposed composite three-dimensional image after the image pathways have been shifted, as well as alternately and intermittently occluded. For example, in some embodiments, the image pathway compositing component may be one or more electronic image sensors (including electronic sensors present in the recording device for the coincident superimposed composite three-dimensional image, such as a video camera, etc), etc. In other embodiments, the image pathway compositing component may be, for example, a coincidence image pathway element (e.g., an angularly adjustable transmissive and reflective glass plate) which transmits and reflects one image pathways after being shifted; and an image pathway reflector element (e.g., an angularly adjustable mirror) positioned to receive and reflect the other of the image pathways after being shifted (as well as alternately and intermittently occluded) so as to form the coincident superimposed composite three-dimensional image.

For the purposes of the present invention, the term "adjustable" refers to the ability to angularly adjust a surface, element, component, etc.

For the purposes of the present invention, the term "transmissive and reflective glass" refers to glass which has first surface which may receive and transmit (i.e., permits the passage therethrough) of images, image paths, image pathway, etc., which are received in one direction, and which has a second surface which may receive and reflect images, image paths, image pathways, etc., which are received in the opposite direction.

For the purposes of the present invention, the term "mirror" refers to a component, element, etc., having at least one reflective surface.

For the purposes of the present invention, the term "reflective surface" refers to a surface which may optically reflect images, image paths, image pathways, etc.

For the purposes of the present invention, the term "substantially parallel" refers to surfaces, etc., which are exactly parallel or almost parallel.

For the purposes of the present invention, the term "coincident superimposed composite image" refers to the combined image(s) created when two images, image paths, image pathways, etc., are superimposed on each other to provide a composite image.

For the purposes of the present invention, the term "record" refers to taking, capturing, obtaining, etc., images, etc., temporarily or permanently, in a recording medium which may include, for example, film, videotape, electronic data storage (e.g., hard drive, memory chip, etc.), electronic random access memory (RAM), image sensor, image scanner, etc.

For the purposes of the present invention, the term "camera" refers to an optical instrument which records and/or displays images which may be stored directly, transmitted to another location, or both. These images may be still photographs, moving images such as videos, movies, etc.

For the purposes of the present invention, the term "digital camera" refers to a camera which encodes digital images or videos digitally and stores them for later reproduction, display, etc. Digital cameras may also include devices such as smartphones, electronic tablets, other screen display devices, other video display devices, etc., which include a digital camera feature.

For the purposes of the present invention, the term "smartphone" (also known as a "smart phone") refers to a handheld mobile device with more advanced computing capability and connectivity than basic feature phones, and which may use mobile operating systems such as iOS, Android, BlackBerry (mobile) operating systems (OS), Windows Phone (mobile) operating systems (OS), etc. Smartphones may provide, in addition to digital cameras, various other features such as keyboards, touchscreens, personal digital assistants (PDAs), media players, web browsing, wireless connectivity (Wi-Fi), GPS navigation units, etc.

For the purposes of the present invention, the term "electronic tablet" (also known as a "tablet computer" or "tablet") refers to a mobile computer having, for example, a touchscreen display, circuitry, battery, etc. Electronic tablets may also be equipped with sensors, digital cameras, a microphone, an accelerometer, etc., wherein the touchscreen display uses finger gestures, stylus gestures, etc., in place of a physical computer mouse and/or keyboard for moving the cursor, inputting data, etc., on-screen, pop-up virtual keyboards for typing, physical buttons for basic features such as speaker volume. power, etc., ports for network communications, battery charging, etc.

For the purposes of the present invention, the term "video camera" refers to a camera which acquires, takes, etc., moving images electronically, and which may provide the acquired, taken, etc., images directly, store those images for later display and/or reproduction, or both.

For the purposes of the present invention, the term "comprising" means various devices, components, elements, capabilities, steps, etc., may be conjointly employed in embodiments of the present invention. Accordingly, the term "comprising" encompasses the more restrictive terms "consisting essentially of" and "consisting of."

For the purposes of the present invention, the terms "a" and "an" and similar phrases are to be interpreted as "at least one" and "one or more." References to "an" embodiment in this disclosure are not necessarily to the same embodiment.

For the purposes of the present invention, the term "and/or" means that one or more of the various devices, components, elements, capabilities, steps, etc., may be employed in embodiments of the present invention.

Description

Embodiments of the present invention relate to a device which uses image-shifting elements (e.g., optical elements) which are arranged in a particular configurations and orientations to create more natural three-dimensional (3D) image effects (e.g., a natural-like vision three-dimensions), as well as to enhance such natural-appearing three-dimensional images. These created or enhanced three-dimensional (3D) image effects may then be recorded and/or stored by video/digital equipment such as video cameras, other video storage devices, etc., to provide improved and more natural looking three-dimensional (3D) recordings. These improved and more natural looking three-dimensional (3D) recordings may be displayed, for example, by projectors (e.g., on display screens), by televisions, iconoscopes, computers, videotape players, DVD players (e.g., Blu-ray players), etc. In particular, these more natural looking and improved three-dimensional effects provided by such recordings may be achieved without the need of additional viewing aids, such as, for example, special glasses, video headsets, etc., thus also enabling the creation of computer screens and visual displays which may include in three dimensional (3D) form: graphics that include coordinate systems (e.g., algebraic, radial, hyperbolic, etc.); dimensional analyses; video game consoles; e-readers having three dimensional (3D) pictures, graphics, etc.; integration of three (3D) dimensional images into printer programs; plug-ins; three dimensional (3D) imagery (special and/or mathematical); for displays with any number of perspectives and/or dimensions, the ability to increase "speed-of-change" between displays, thus compositing them into groups, video home system (VHS) recording, displaying, etc.; etc.

Embodiments of the device of the present invention for creating, as well as enhancing the visual three-dimensional (3D) image effects of an object (e.g., person(s)), several objects, scenes, landscapes, etc., may use at least two image pathways (each comprising a plurality of image paths) which are formed from respective portions of the image framed by two horizontally spaced apart image areas comprises: an intermittent image pathway occluder for alternately and intermittently blocking/opening for, turning on/off, etc., the passage and/or receipt of these image pathways; image-shifting components which may be arranged, configured and/or oriented to receive and shift these image pathways; and one or more components for creating a coincident superimposed composite image after these pathways have been shifted by the image-shifting components. In one embodiment for at least creating a three-dimensional effect, the device may comprise an intermittent image pathway occluder for alternately and intermittently occluding two separate image pathways. The device further includes a horizontal imaging-shifting component for shifting at least one (and optionally both) of the two image pathways leftward or rightward along a horizontal axis, and which has at least one (and optionally a pair of) horizontal image-shifting element which is positioned to receive and shift at least one of the two image pathways leftward or rightward. The device further includes a vertical imaging-shifting component for shifting the two image pathways upward and downward along a vertical axis which has an upward image-shifting element and a downward image-shifting element, wherein the upward image-shifting element is positioned to receive and shift one of the two image pathways upward and wherein the downward image-shifting element is positioned to receive and shift the other of the two image pathways downward. The device also includes an image pathway compositing component which forms a coincident superimposed composite three-dimensional image from the image pathways after the image pathways have been shifted by the horizontal imaging-shifting component and the vertical imaging-shifting component, each of the respective horizontally and vertically shifted image pathways having also been alternately and intermittently occluded by the intermittent image pathway occluder.

In some embodiments of the device of the present invention, these image-shifting components may be in the form of, for example, optical wedges, etc., which may be arranged, configured and/or oriented to receive these two image pathways after passing through an intermittent image pathway occluder (e.g., intermittent optical shutter, rotating fan, etc.) which alternately and intermittently blocks/opens for, etc., the passage of the two respective image pathways. In some embodiments, the device comprises a (first) horizontal imaging-shifting element set (e.g., one or a first pair of optical wedges) and a (second) vertical imaging-shifting element set (e.g., a second pair of optical wedges) a through which these two respective image pathways pass through and which shift the image pathways (horizontally or vertically) depending upon how each optical wedge is oriented. For the (first) horizontal image-shifting element set, one of these image pathways is shifted either in the leftward or rightward direction, while the other image pathway is (optionally) shifted in the opposite rightward or leftward direction. In order to provide enhanced three-dimensional effects, each of these image pathways is shifted in both the leftward and the rightward direction (e.g., by using a first pair of optically wedges).

For the (second) vertical image-shifting element set, one of the two image pathways is shifted in the downward (or upward) direction, while the other of the image pathways is shifted in the opposite upward (or downward) direction. The respective shifted image pathways are then superimposed (alternately and intermittently, for example, by having the image pathways pass through the intermittent optical image pathway occluder prior to being shifted by the respective horizontal image-shifting and vertical image-shifting element sets) on each other (through, for example, the use of the combination of an image pathway reflector element and a coincidence image pathway element which transmits and reflects image pathways) to form a coincident composite three-dimensional image (the composite three-dimensional image being enhanced where both image pathways are shifted in the horizontal direction) which may be received and recorded by, for example, a video camera, etc., for subsequent display as an (enhanced) three-dimensional image recording.

Some embodiments of the device of the present invention may create and enhance these three-dimensional image effects by receiving at least three (e.g., three or four) separate image pathways. In such embodiments, a first set of optical elements (e.g., optical wedges) shift one and/or two of the three or four image pathways either leftward and/or rightward along a horizontal optical axis, while a second set of optical elements (e.g., optical wedges) shift the remaining two of the image pathways upward and downward along a vertical optical axis. One or more (e.g., one, two, three, or four) electronic image sensors or image scanners are positioned to receive each of the three or four shifted image pathways such that the image sensor(s)/scanner(s) operate to alternately and intermittently receive the upward and downward shifted image pathways, as well as, when receiving both leftward and rightward shifted image pathways, operate to alternately and intermittently receive the leftward and rightward shifted image pathways. An image pathway compositing component (e.g., a video camera, or which the electronic image sensor(s)/scanner(s) receiving the image pathways may also function as) then forms a coincident superimposed composite three-dimensional image from these received leftward and/or rightward shifted image pathways, as well as these received upward, and downward shifted image pathways.

Embodiments of the device of the present invention may be hand-held devices, may be mounted on mobile equipment for mobile movement of the device, etc. Embodiments of the device of the present invention may be separate attachments for image recording equipment, such as video cameras, or may be incorporated into such image recording equipment. Embodiments of the device of the present invention may be used to carry out any of a variety of tasks where the recording, displaying, etc., of images to create three-dimensional (3D) effects may be desirable, including video recording of persons, objects, scenes, landscapes, etc., either indoors or outdoors; manufacturing operations for the assembly or disassembly of products, machines, equipment, etc., including, for example, remote robotic recording, monitoring, displaying, observing, etc., for such operations, etc.

Figure 2:
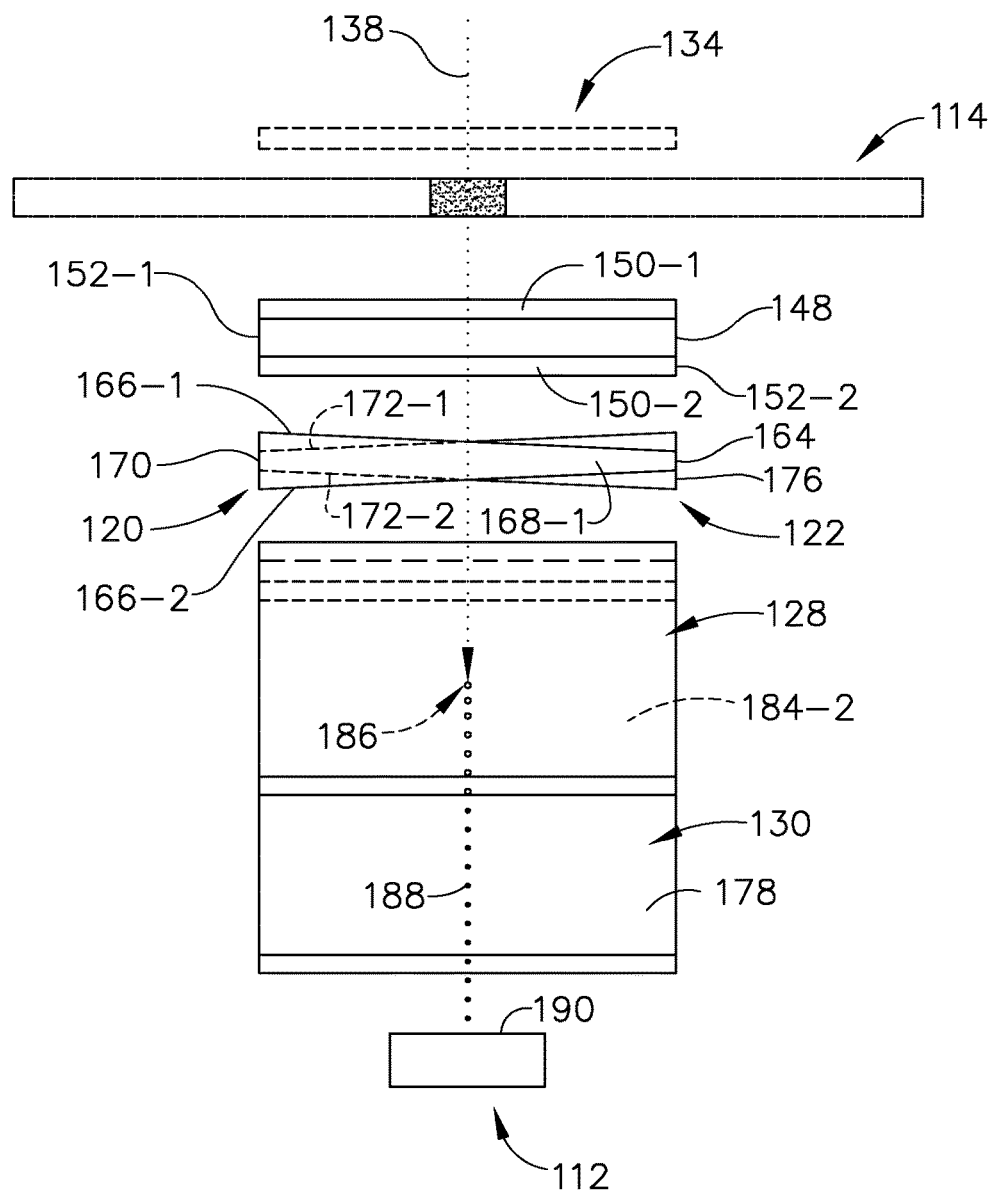
FIG. 2 is side elevational view of the schematic diagram of the embodiment shown in FIG. 1.

Embodiments of the device of the present invention for creating (as well as enhancing) the three-dimensional effect of an image(s), as well as the various components, elements, features, etc., thereof are further illustrated in FIGS. 1 through 15. FIGS. 1 and 2 illustrate schematically one embodiment of such a device for creating, as well as enhancing such three-dimensional effects which is indicated generally as 100. Device 100 may be used in conjunction with, for example, a video camera having image receiving lens, indicated as 112, for recording the resulting (enhanced) three-dimensional image. Device 100 includes an intermittent optical occluder such as fan 114 (which essentially operates as a high speed intermittent rotating shutter); a first set of image-shifting elements comprising a right forward optical wedge 116 (the "rightward image-shifting wedge" because the image passing through optical wedge 116 is shifted towards the right) positioned behind fan 114, and a left forward optical wedge 118 (the "leftward image-shifting wedge" because the image(s) passing through optical wedge 118 is shifted towards the left) also positioned behind fan 114; a second set of imaging-shifting elements comprising a right rearward optical wedge 120 (the "downward image-shifting wedge" because the image(s) passing through optical wedge 120 is shifted downward) positioned behind optical wedge 116, and a left rearward optical wedge 122 (the "upward image-shifting wedge" because the image(s) passing through optical wedge 122 is shifted upward) positioned behind optical wedge 118; an angularly adjustable rectangular-shaped coincidence glass plate 128 positioned behind optical wedge 120; and an angularly adjustable rectangular-shaped reflective mirror 130 positioned behind optical wedge 122. In some embodiments of device 100, either optical wedge 116 or optical wedge 118 may be omitted. In some embodiments of device 100, glass plate 128 may instead be a two-way mirror.

Device 100 views two essentially rectangular-shaped image areas, right image area being indicated generally as 134, and the left image area being indicated as 136. The image pathways (each comprising a plurality of such image paths) pass through each of respective image areas 134 and 136, and are illustrated by respective dotted arrows 138 and 134 which represent one such image path of each of the respective image pathways. As fan 114 rotates about hub 142, the blades of fan 114 sweep a shaded circular area indicated by arrow 144, and thus intermittently and alternately interrupts (blocks) the optical passage of image paths 138 and 140.

Each of optical wedges 116, 118, 120, and 122 may have a triangular-shaped cross-section, trapezoidal-shaped cross-section, etc., but are illustrated in FIGS. 1 and 2 as having a trapezoidal-shaped cross-section. As shown in FIGS. 1 and 2, optical wedge 116 has a thicker rectangular-shaped base 146, a thinner rectangular-shaped apex 148, a pair of opposed inwardly slanted rectangular-shaped input and output faces 150-1 and 150-2 (face 150-1 being the input face, face 150-2 being output face) extending from base 146 to apex 148, and a pair of opposed trapezoidal-shaped side edges 152-1 and 152-2 connected to faces 150-1 and 150-2, also extending parallel to each other from base 146 to apex 148. Similarly, optical wedge 118 has a thicker base rectangular-shaped 154, a thinner rectangular-shaped apex 156, a pair of opposed inwardly slanted rectangular-shaped input and output faces 158-1 and 158-2 (face 158-1 being the input face, face 158-2 being the output face) extending from base 154 to apex 156, and a pair of opposed trapezoidal-shaped side edges (only one of which, 160-1, is shown in FIG. 1), and connected to faces 158-1 and 158-2, also extending parallel to each other from base 154 to apex 152. As shown especially in FIG. 1, the respective bases 146 and 154 of optical wedges 116 and 118 are spaced apart adjacently and opposed to each other such that the respective apexes 148 and 156 point outwardly, respectively, either towards the right or towards the left (i.e., optical wedges 116 and 118 are oriented 180° different with respect to each other).

As further shown in FIGS. 1 and 2, optical wedge 120 also has a thicker rectangular-shaped base 162, a thinner rectangular-shaped apex 164 (indicated by dashed lines in FIG. 1), a pair of opposed inwardly slanted rectangular-shaped input and output faces 166-1 and 166-2 (face 166-1 being the input face, face 166-2 being the output face) extending downward from base 162 to apex 164, and a pair of opposed trapezoidal-shaped side edges 168-1 and 168-2 connected to faces 166-1 and 166-2, also extending parallel to each other from base 162 to apex 164. Optical wedge 120 is oriented such that its apex 164 points downward, and is also oriented such that apex 164 of optical wedge 120 is rotated 90° with respect to apex 148 of optical wedge 116. As further shown in FIG. 1, optical wedge 122 also has a thinner rectangular-shaped apex 170, a pair of opposed inwardly slanted rectangular-shaped side input and output faces 172-1 and 172-2 (face 172-1 being the input face, face 172-2 being the output face) extending upward from a thicker rectangular-shaped base 176 (shown only in FIG. 2) to apex 170, and a pair of opposed trapezoidal-shaped side edges 174-1 and 174-2 connected to faces 172-1 and 172-2, also extending parallel to each other from base 176 to apex 170. As further shown FIG. 1, optical wedge 122 is oriented so that its apex 170 points upward, and is also oriented such that apex 170 is rotated 90° with respect to apex 156 of optical wedge 118 (i.e., optical wedges 118 and 122 are oriented 90° with respect to each other). As further shown in FIG. 1, apex 164 of optical wedge 120 is oriented 180° opposite that of apex 170 of optical wedge 122 (i.e., optical wedges 120 and 122 are oriented 180° with respect to each other).

In operation, and as shown in FIGS. 1 and 2, image path 138 passes through optical wedge 116 (via input and output faces 150-1 and 150-2) and optical wedge 120 (via input and output faces 166-1 and 166-2), and then reaches and passes through glass plate 128 (i.e., forward transmissive surface 184-1 of glass plate 128 transmits image path 138). As also shown in FIG. 1, image path 140 passes through optical wedge 118 (via input and output faces 160-1 and 160-2) and optical wedge 122 (via input and output faces 172-1 and 172-2) and is then shown as reaching (striking) forward reflective surface 178 of mirror 130 at incidence point 180. The reflected image path 140 at point 180, indicated by angled arrow 182, is then shown as reaching (striking) rearward reflective surface 184-2 of glass plate 128 at incidence point 186 where image path 138 passes through glass plate 128. (As shown in FIG. 1, mirror 130 and plate 128 are angularly adjusted such that surface 178 is parallel or substantially parallel to surface 184-2.) Reflected image path 182 is superimposed on image path 140 passing through glass plate 128 to provide a combined coincident composite three-dimensional image, indicated by arrow 188, which is received at surface 190 of lens 112, and which may then be recorded by, for example, a video camera of which lens 112 is part of (The total of all superimposed shifted image paths 138 and 140 that have been alternately and intermittently interrupted by rotating fan 114 and which pass through lens 112 and are recorded by the video camera provide the complete composite three-dimensional image.)

Figure 3:
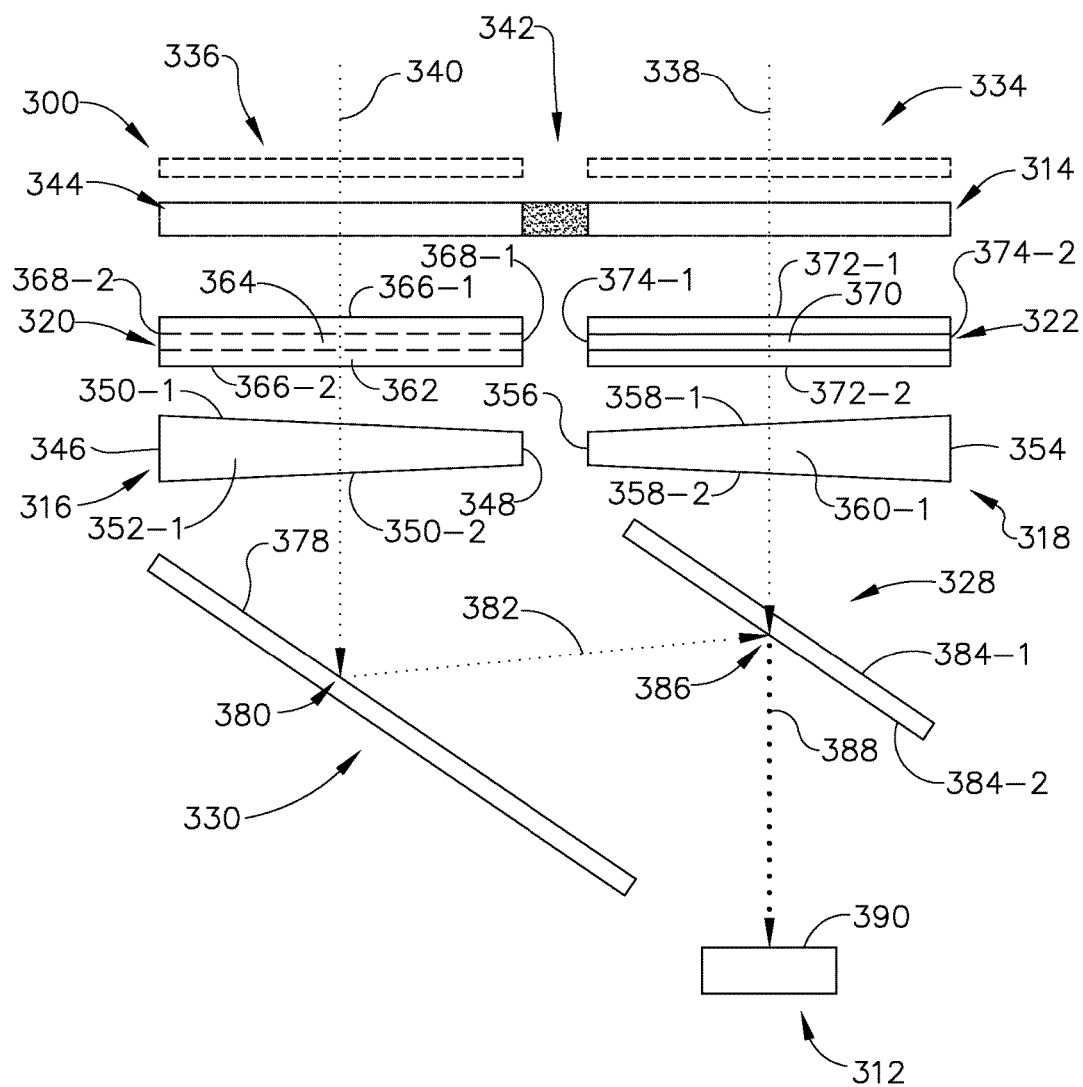
FIG. 3 is a schematic diagram of another embodiment of the device of the present invention.

An alternate embodiment the device of the present invention is also illustrated schematically in FIG. 3. Referring to FIG. 3, this alternate embodiment of the device is indicated generally as 300. As shown in FIG. 3, device 300 may also be used in conjunction with, for example, a video camera having an image receiving lens, indicated as 312. Device 300 also includes an intermittent optical occluder such as fan 314, a left rearward optical wedge 316 (the "rightward image-shifting wedge"), a right rearward optical wedge 318 (the "leftward image-shifting wedge"), a left forward optical wedge 320 (the "downward image-shifting wedge") positioned behind fan 314 but in front of optical wedge 316, a right forward optical wedge 322 (the "upward image-shifting wedge") also positioned behind fan 314 but in front of optical wedge 318, an angularly adjustable rectangular-shaped coincidence glass plate 328 positioned behind optical wedge 322, and an angularly adjustable rectangular-shaped reflective mirror 330 positioned behind optical wedge 322. Similar to device 100, in some embodiments of alternate device 300, either optical wedge 316 or optical wedge 318 may be omitted. Similar to device 100, in some embodiments of alternate device 300, glass plate 328 may instead be a two-way mirror.

Like device 100, and shown in FIG. 3, alternate device 300 also views two essentially rectangular image areas, right image area being indicated generally as 334, and the left image area being indicated as 336. The image pathways passing through image areas 334 and 336 are similarly represented by respective image paths indicated by dotted arrows 338 and 334. Like fan 114, as fan 314 rotates about hub 342, the blades of fan 314 sweeping a shaded circular area indicated by arrow 344, and thus alternately and intermittently interrupts (blocks) the passage of image paths 338 and 340.

As shown in FIG. 3, optical wedge 316 has a thicker rectangular-shaped base 346, a thinner rectangular-shaped apex 348, a pair of opposed inwardly slanted rectangular-shaped input and output faces 350-1 and 350-2 extending from base 346 to apex 348, and a pair of opposed trapezoidal-shaped side edges (only one of which, 352-1, is shown in FIG. 3), and connected to input and output faces 350-1 and 350-2, also extending parallel to each other from base 346 to apex 348. Similarly, optical wedge 318 has a thicker rectangular-shaped base 354, a thinner rectangular-shaped apex 356, and a pair of opposed inwardly slanted rectangular-shaped input and output faces 358-1 and 358-2 extending from base 354 to apex 356, and a pair of opposed trapezoidal-shaped side edges (only 360-1 of which is shown in FIG. 3) which are connected to input and output faces 358-1 and 358-2, also extending parallel to each other from base 354 to apex 356. As also shown in FIG. 3, optical wedge 320 has a thicker rectangular-shaped base 362, a thinner rectangular-shaped apex 364 (indicated by dashed lines in FIG. 3), a pair of opposed inwardly slanted rectangular-shaped input and output faces 366-1 and 366-2 extending downward from base 362 to apex 364, and pair of opposed trapezoidal shaped side edges 368-1 and 368-2 connected to input and output faces 366-1 and 366-2, also extending parallel to each other from base 362 to apex 364. Optical wedge 320 is oriented so that its apex 364 points downward, and is also oriented such that apex 364 of optical wedge 320 is rotated 90° with respect to apex 348 of optical wedge 316. As further shown in FIG. 3, optical wedge 322 also has a thinner rectangular-shaped apex 370, pair of opposed inwardly slanted rectangular-shaped input and output faces 372-1 and 372-2 extending upward from a thicker rectangular-shaped base (not shown in FIG. 3) to apex 370, and a pair of opposed trapezoidal-shaped side edges 374-1 and 374-2 connected to input and output faces 372-1 and 372-2, also extending parallel to each other from the base 362 to apex 364. As shown FIG. 3, optical wedge 322 is oriented so that its apex 370 points upward, and is also oriented such that 370 apex is rotated 90° with respect to apex 356 of optical wedge 318 (i.e., optical wedges 318 and 322 are oriented 90° with respect to each other). As further shown in FIG. 3, apex 364 of optical wedge 320 is oriented 180° opposite that of apex 370 of optical wedge 322 (i.e., similar to optical wedges 120 and 122 of FIG. 1).

In operation, and as shown in FIG. 3, image path 338 passes through optical wedge 322 (via input and output faces 371-1 and 372-2) and optical wedge 318 (via input and output faces 358-1 and 358-2), and then reaches and passes through glass plate 328 (i.e., forward transmissive surface 384-1 of glass plate 328 transmits image path 338). As also shown in FIG. 3, image path 340 passes through optical wedge 320 (via input and output faces 366-1 and 362-2) and optical wedge 316 (via input and output faces 350-1 and 350-2) and is then shown as reaching (striking) forward reflective surface 378 of mirror 330 at incidence point 380. The reflected image path 340 at point 380, indicated by angled arrow 382, is then shown as reaching (striking) rearward reflective surface 384-2 of glass plate 328 at incidence point 386 where image path 338 passes through glass plate 328. (As shown in FIG. 3, mirror 330 and plate 328 are again angularly adjusted such that surface 378 is parallel or substantially parallel to surface 384-2.) Reflected image path 382 is superimposed on image path 340 passing through glass plate 328 to again provide a combined coincident composite three-dimensional image, indicated by arrow 388, which is received at surface 390 of lens 312, and which may then be recorded by, for example, a video camera of which lens 312 is part of (The total of all superimposed shifted image paths 338 and 340 that have been alternately and intermittently interrupted by rotating fan 314 and which pass through lens 312 and are recorded by the video camera again provide the complete composite three-dimensional image.)

As alternate device 300 illustrates, the positioning of respective optical wedges 316, 318, 322, and 320 of FIG. 3 may be changed (relative to positioning of optical wedges 116, 118, 120, and 120 shown in FIGS. 1 and 2) to provide the same or similar benefits as device 100. In particular, device 300 shows that the positioning of leftward and rightward image-shifting optical wedges 316 and 318 relative to each other has been reversed (rotated) 180° such that the respective apexes 356 and 348 facing inwardly, while the respective bases 354 and 364 face outwardly. Similarly, the positioning of upward and downward image-shifting optical wedges 320 and 322 has also been switched such optical wedge 320 (having apex 364 which is oriented to face downward, thus shifting image path 340 passing through optical wedge 320 downward) is positioned left behind fan 314 and in front of optical wedge 316, while optical wedge 322 (having apex 370 which is oriented to face upward, thus shifting image path 338 passing through optical wedge 322 upward) is positioned right behind fan 314 and in front of leftward shifting optical wedge 318.

The image-shifting effects which may be achieved with optical wedges 116/118/120/122 (or optical wedges 316/318/320/322) are illustrated in FIGS. 4 and 5. FIG. 4 illustrates the rightward image-shifting effect caused by optical wedge 116. As shown in FIG. 4, a collection of image paths (i.e., traveling through image pathway 138) representing an object (e.g., person), indicated generally as 404, which includes an upper portion indicated generally as 408, and a lower portion, indicated generally as 412, reaches optical wedge 116. As illustrated in FIG. 4, the lower portion 412 of the collective image paths 404 is shown entering input face 150-1 of optical wedge 116, passing through optical wedge 116, and then exiting through output face 150-2. As further as further illustrated in FIG. 4, the lower portion 412 of the collective image paths 404 is shifted in the rightward direction from thicker base 146 towards thinner apex 148, as indicated by arrow 416, due to the image-shifting (deflection) caused by inward slanting input and output faces 150-1 and 150-2 of optical wedge 116.

Similarly, FIG. 5 illustrates the image-shifting effect caused by optical wedge 120, but now in the downward direction. As shown in FIG. 5, a collection of image paths (i.e., again traveling through image pathway 138) representing an object (e.g., person), indicated generally as 504, which includes an upper portion indicated generally as 508, and a lower portion, indicated generally as 512 now reaches optical wedge 120. As illustrated in FIG. 5, the lower portion 512 of the collective image paths 504 enters input face 166-1, passes through optical wedge 120, and then exits through output face 166-2. As further illustrated in FIG. 5, the lower portion 512 of the collective image paths 504 is shown as being shifted downward in the direction from thicker base 162 towards thinner apex 164, as indicated by arrow 516, due to the image-shifting (deflection) caused by inward slanting input and output faces 166-1 and 166-2 of optical wedge 120.

In place of separate combinations of, for example, optical wedges 116/120 and optical wedges 118/122 as illustrated in FIG. 1 for shifting images horizontally, as well as vertically, compound optical wedges, such as those illustrated in FIGS. 6 and 7 may be used. FIG. 6 illustrates an embodiment of a compound optical wedge, indicated generally as 616, which combines the horizontal image-shifting capability of optical wedge 116 with the vertical image-shifting capability of optical wedge 120. As shown in FIG. 6, compound optical wedge 616 has a first trapezoidal-shaped base 646, a first trapezoidal-shaped apex 648, a second trapezoidal-shaped base 652-1, a second trapezoidal-shaped apex 652-2, and a pair of opposed inwardly slanted rectangular-shaped input and output faces 650-1 and 650-2 connected to and extending, respectively, from first base 646 to first apex 648, as well as from second base 652-1 to second apex 652-2. As further shown by FIG. 6, segment 660-1 (of first base 646 and second base 652-1) is greater in length compared to segment 660-2 (of first apex 648 and second base 652-1), while segment 664-1 (of first base 646 and second apex 652-2) is greater in length compared to segment 664-2 (of first apex 648 and second apex 652-2). In addition, and as also shown in FIG. 6, segment 660-1 is also greater in length compared to segment 664-1, while segment 660-2 is greater in length compared to segment 664-2. As a result, when image paths pass through compound optical wedge 616 from input face 650-1 to output face 650-2, the image paths will collectively be shifted rightward, as indicated by right-pointing arrow 672, as well as downward, as indicated by downward-pointing arrow 676.

Another embodiment of a compound optical wedge is illustrated in FIG. 7, and indicated generally as 718, which combines the horizontal image-shifting capability of optical wedge 118 with the vertical image-shifting capability of optical wedge 122. As shown in FIG. 7, compound optical wedge 718 has a first trapezoidal-shaped base 754, a first triangular-shaped apex 756, a second triangular shaped apex 760-1, a second trapezoidal-shaped base 760-2, and pair of opposed inwardly slanted rectangular-shaped input and output faces 758-1 and 758-2 connected to and extending, respectively, from first base 754 to first apex 756, as well as from second base 760-2 to second apex 760-1. As further shown by FIG. 7, segment 764-1 (of first apex 756 and second base 760-2) is shorter in length compared to segment 764-2 (of first base 754 and second base 760-2); while segment 768-2 (of first base 754 and second apex 760-1) is longer in length compared to corner 768-1 (of first apex 756 and second apex 760-1). In addition, and as also shown in FIG. 7, segment 764-1 is longer in length compared to corner 768-1, while segment 764-2 is longer in length compared to segment 768-2. As a result, when image paths pass through compound optical wedge 718 from input face 758-1 to output face 758-2, these image paths will be collectively shifted leftward, as indicated by left-pointing arrow 776, as well as upward, as indicated by upward-pointing arrow 780.

Figure 8:
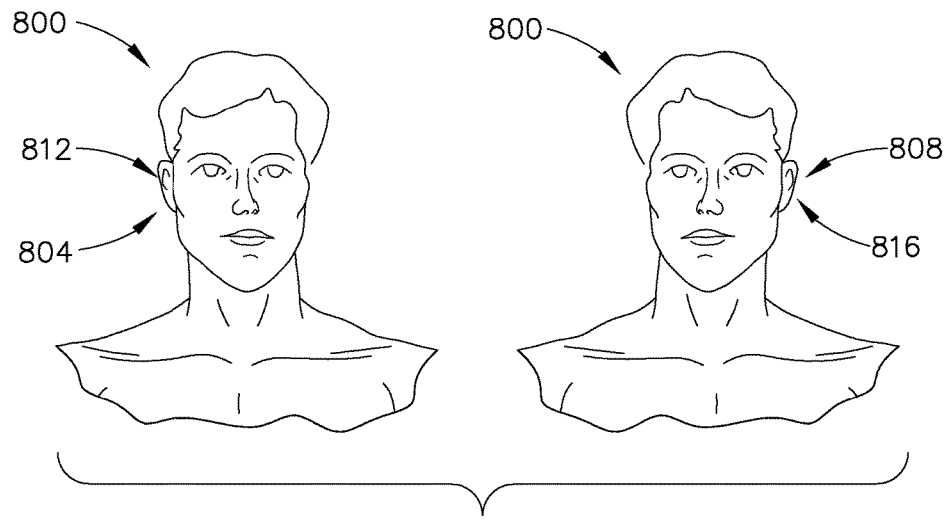
FIG. 8 is a perspective view of two images of a human head and upper body after being shifted rightward and leftward after passing through the respective optical wedges.
Figure 9:
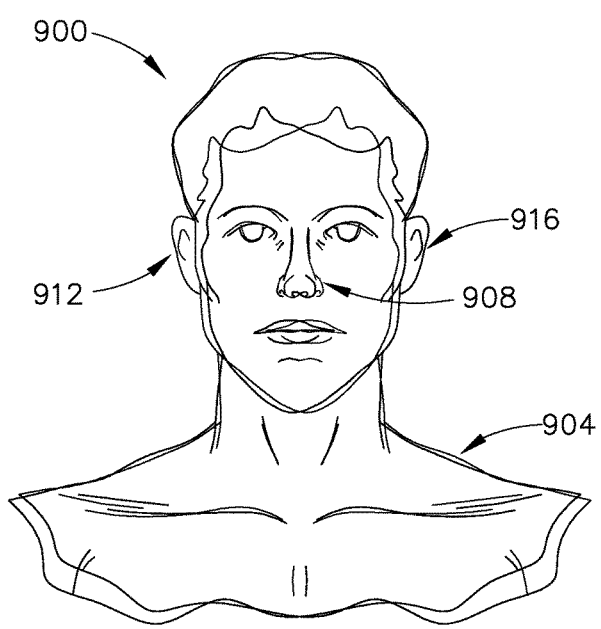
FIG. 9 is a perspective view of a composite image formed by superimposing the two images of FIG. 8 but without the two images being superimposed alternately and intermittently in forming the composite image.
Figure 10:
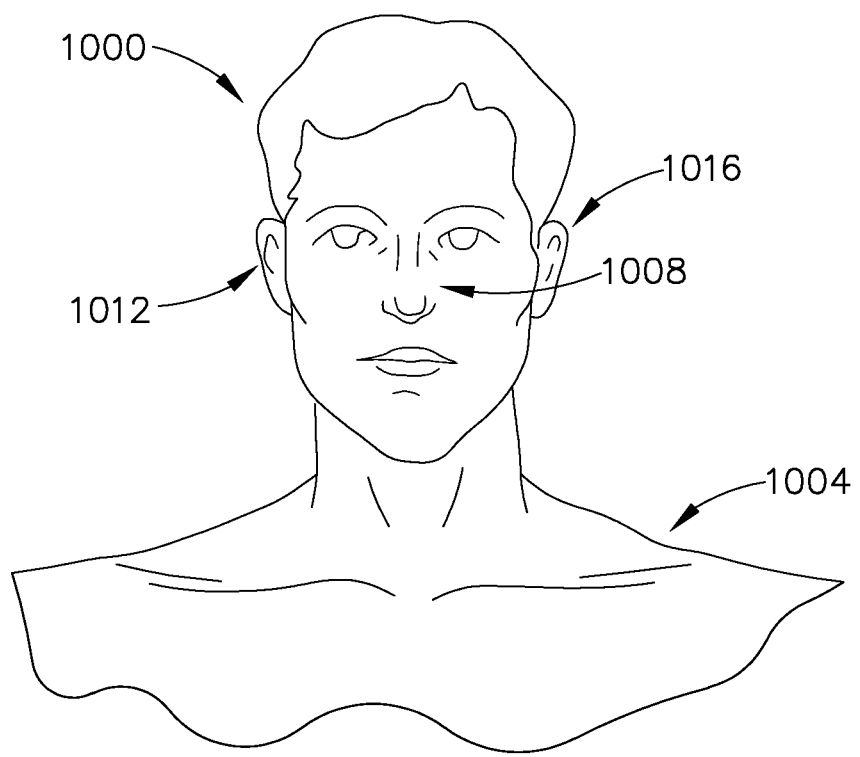
FIG. 10 is a perspective view of a composite image formed by superimposing the two images of FIG. 8 but with the two images being superimposed alternately and intermittently in forming the composite image.

FIGS. 8 through 10 illustrate the effects of superimposing a pair of images of a human head and upper body which have been shifted rightward after passing through, for example, optical wedges 116/316, as well as shifted leftward after passing through, for example, optical wedges 118/318. FIG. 8 shows a pair of images of a human head and upper body indicated generally as 800. The image shifted rightward (e.g., by optical wedges 116/316) is indicated generally as 804, while the image shifted leftward (e.g., by optical wedges 118/318) is indicated generally as 808. Rightward shifted image 804 shows the left ear 812, while leftward shifted image 808 shows the right ear 816.

FIG. 9 represents images 804 and 808 being coincident and superimposed to provide composite image 900 of the human head and upper body, but where images 804 and 808 have not been superimposed alternately and intermittently in forming the composite image 900. As a result, instead of images 804 and 808 enhancing the three-dimensional (3D) effects of the features of composite image 900, the coincident superimposed images 804 and 808 cause a slight "broadening," "distortion,""blurring," or "fuzziness" of the features shown in composite image 900 as suggested, for example, by the broadened/fuzzy general outline (indicated by arrow 904) of the head and upper body shown by composite image 900, as well as the broadened/fuzzy outline of the nose (indicated by 908) shown in composite image 900. (That image 900 is a composite of images 804 and 808 is further shown by the presence of right ear 912 provided by image 804 and left ear 916 provided by image 808.) By contrast, FIG. 10 represents images 804 and 808 being coincident and superimposed to provide composite image 1000, but where images 804 and 808 have been superimposed alternately and intermittently in forming the composite image 1000. As a result, the alternate and intermittent superimposing of images 804 and 808 does not cause "broadening," "distortion," "blurring," or "fuzziness" of the features of composite image 1000, but instead enhances the three-dimensional (3D) effects of those features of composite image 1000, as suggested, for example, by the sharper outline (indicated by arrow 1004) of the upper body and head shown in composite image 1000, as well as the sharper outline of the nose (indicated by 1008) shown in composite image 1000. (That image 1000 is a composite of images 804 and 808 is further shown by the presence of right ear 1012 provided by image804 and left ear 1016 provided by image 808.)

Figure 11:
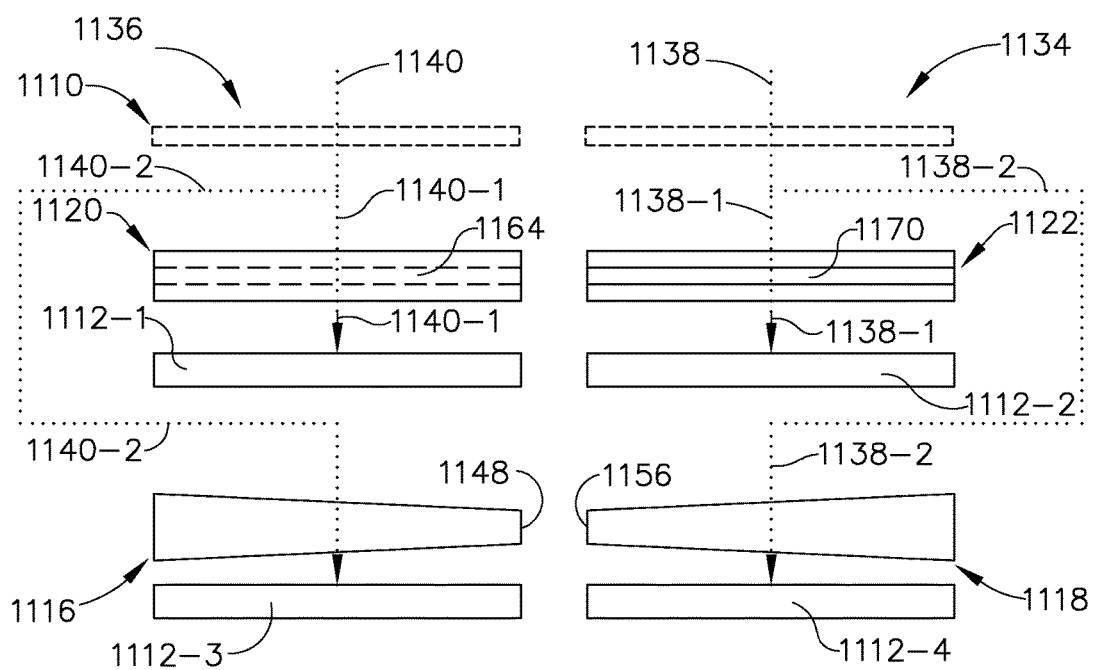
FIG. 11 is a schematic diagram of an another embodiment of the device of the present invention using four separate electronic image receptor elements.

FIG. 11 is a schematic diagram of another embodiment of the device of the present invention indicated generally as 1100. Device 1100 uses four separate electronic image receptor elements, each of which may be a charge-coupled device (CCD) image sensor/scanner, a contact image sensor (CIS), an active-pixel sensor (APS) such as a complementary metal-oxide semiconductor (CMOS) sensor, etc., and which are indicated respectively as first image receptor element 1112-1, a second image receptor element 1112-2, a third image receptor element 1112-3, and a fourth image receptor element 1112-4. Device 1100 also includes a rightward image-shifting optical wedge 1116 (and having apex 1148), a leftward image-shifting optical wedge 1118 (and having apex 1156), a downward image-shifting optical wedge 1120 (and having apex 1164) positioned forward of optical wedge 1116, and an upward image-shifting optical wedge 1122 (and having apex 1170) positioned forward of optical wedge 1118. As further shown in FIG. 11, image receptor element 1112-1 is positioned behind optical wedge 1120, image receptor element 1112-2 is positioned behind optical wedge 1122, image receptor element 1112-3 is positioned behind optical wedge 1116, and image receptor element 1112-4 is positioned behind optical wedge 1118. Similar to devices 100 and 300, in some embodiments of device 1100, either optical wedge 1116 or optical wedge 1118 may be omitted, as well as either image receptor element 1112-3 or image receptor element 1112-4.

As further shown in FIG. 11, after passing, respectively, through image area 1134 and image area 1136, image pathway 1140 is split into two image pathways, each comprising a plurality of such image paths but represented as one such image path indicated by respective dotted arrows 1138-1 and 1138-2, while image pathway 1140 is split into two image pathways, each comprising a plurality of such image paths but represented as one such image path indicated by respective dotted arrows 1140-1 and 1140-2, i.e., a total of four image paths/pathways. Image path 1138-1 is shown as passing through optical wedge 1122 and shifted upward before being received by image receptor element 1112-2. Image path 1138-2 is shown as passing through optical wedge 1118 and being shifted leftward before being received by image receptor element 1112-4. Image path 1140-1 is shown as passing through optical wedge 1120 and being shifted downward before being received by image receptor element 1112-3. Image path 1140-2 is shown as passing through optical wedge 1116 and being shifted rightward before being received by image receptor element 1112-4. Image receptor elements 1112-1 and 1112-2 operate alternately and intermittently (e.g., by alternately and intermittently turning elements 1112-1 and 1112-2 on and off) to receive the downward-shifted image path 1140-1 and the upward-shifted image path 1138-1. Similarly, image receptor elements 1112-3 and 1112-4 operate alternately and intermittently (e.g., by alternately and intermittently turning elements 1112-3 and 1112-4 on and off) to receive the rightward-shifted image path 1140-2 and the leftward-shifted image path 1138-2. The shifted image paths received by image receptor elements 1112-1 through 1112-4 may then be superimposed to form a coincident composite image having enhanced (3D) three-dimensional effects. For example, the image receptor elements 1112-1 through 1112-4 may be electronic components of, for example, a video camera which converts the received shifted image paths/pathways as digital images (or as digital signals of such images), and which then superimposes those digital images (e.g., through the use of conventional hardware and/or software present in the video camera for recording and storing such digital images, as well as through the use of image receptor elements 1112-1 through 1112-4 which may also function to superimpose, record, and store these digital images) as a coincident composite image having enhanced (3D) three-dimensional effects.

Figure 12:
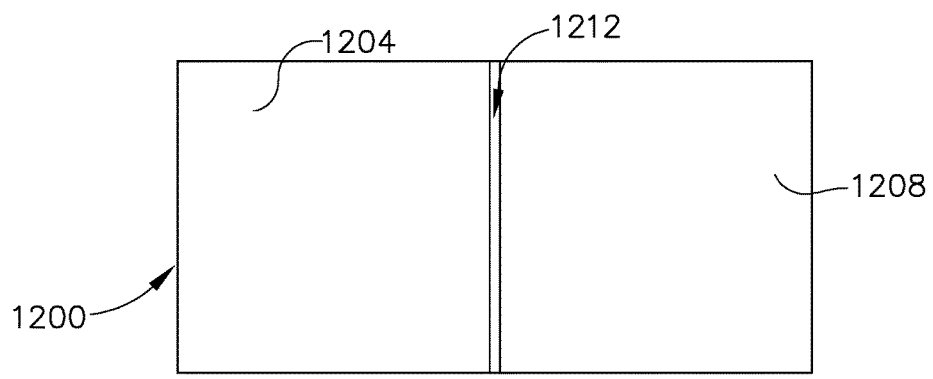
FIG. 12 is perspective view of an embodiment of an electronic image receptor component comprising two adjacent image receptor elements.

FIG. 12 illustrates an alternative embodiment of an electronic image receptor component indicated generally as 1200. Electronic image receptor component 1200 comprises a pair of adjacent image receptor elements 1204 and 1208. Image receptor elements 1204 and 1208 may be separate image receptor elements, or may comprise a single a single image receptor component divided into two image receptor sections by a divider, indicated generally as 1212.

Figure 13:
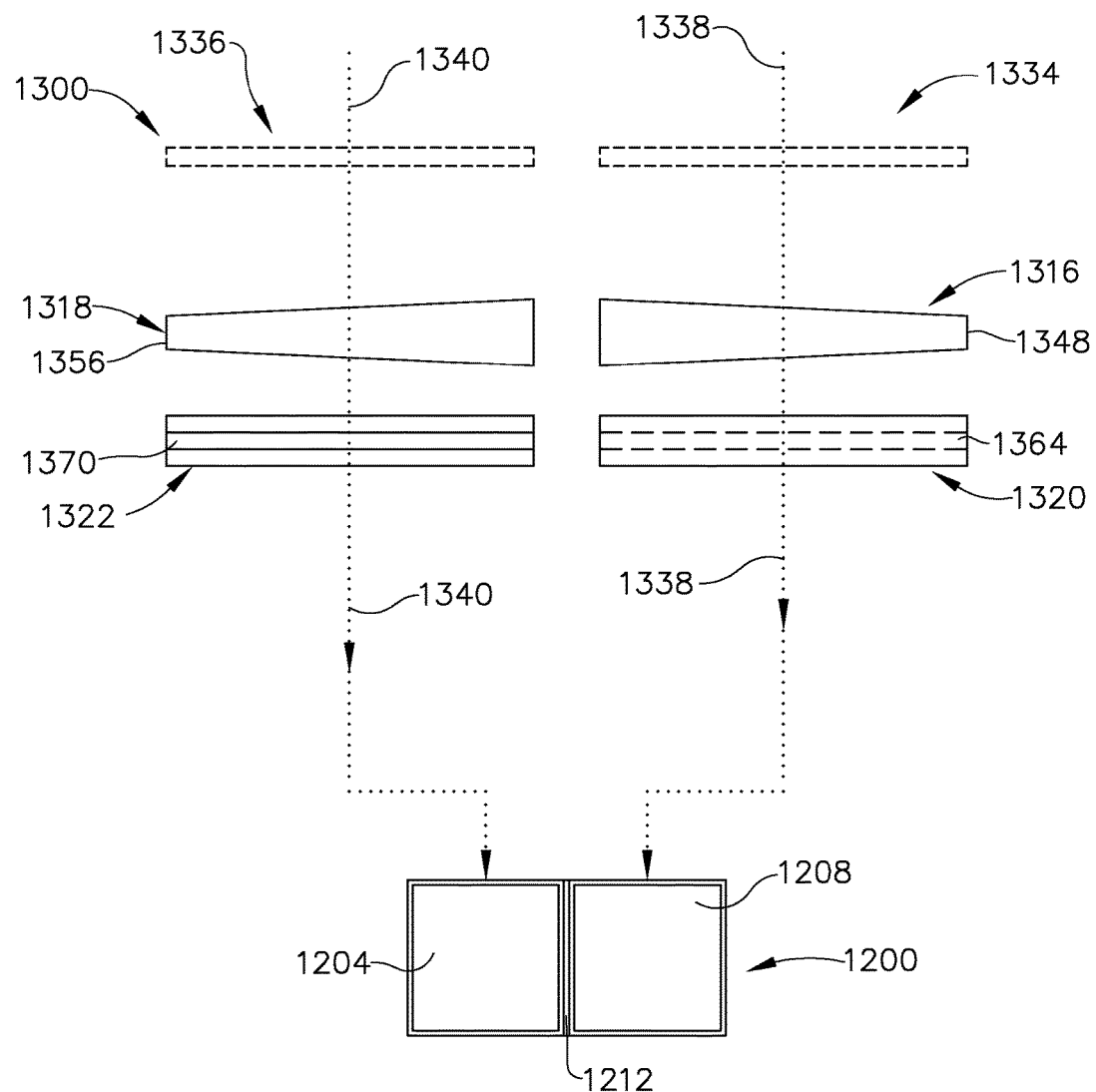
FIG. 13 is a schematic diagram of another embodiment of the device of the present invention using the embodiment of the electronic image receptor component shown in FIG. 12.

FIG. 13 is a schematic diagram of an another embodiment of the device of the present invention using electronic image receptor component 1200 of FIG. 12 and which is indicated generally as 1300. As shown in FIG. 13, device 1300 includes a rightward image-shifting optical wedge 1316 (and having apex 1348), a leftward image-shifting optical wedge 1318 (and having apex 1356), a downward image-shifting optical wedge 1320 (and having apex 1364), and an upward image-shifting optical wedge 1322 (and having apex 1370), each of which is positioned similarly to optical wedges 116, 118, 120 and 122 of device 100 of FIG. 1. Similar also to FIG. 1, FIG. 13 shows image pathways passing through each of respective image areas 1334 and 1336 (each comprising a plurality of such image paths) are illustrated by respective dotted arrows 1338 and 1334 which represent one such image path of each of the respective image pathways.

Similar to device 100, in some embodiments of device 1300, either optical wedge 1316 or optical wedge 1318 may be omitted.

In operation, and similar to device 100 of FIG. 1, image path 1338 passes through optical wedges 1316 and 1320, and is received by image receptor element 1208 of image receptor component 1200, while image path 1340 passes through optical wedges 1318 and 1322 and is received by image receptor element 1208 of image receptor component 1200. Image receptor elements 1204 and 1208 operate alternately and intermittently (e.g., by alternately and intermittently turning on and off elements 1204 and 1208) to receive shifted image paths 1340 and 1338, respectively. Similar to the operation of image receptor elements 1112-1 through 1112-4 (as described above), the shifted image paths 1338 and 1340 are superimposed to form a coincident composite image having enhanced (3D) three-dimensional effects, for example, by a video camera (and which image receptor component 1200 may also be part of) which converts the received shifted image paths as digital images (or digital signals of such images) and then superimposes those digital images (e.g., through the use of conventional hardware and/or software present in the video camera for recording and storing such digital images, as well as through the use of image receptor component 1200 which may also function to superimpose, record, and store these digital images) as a coincident composite image having enhanced (3D) three-dimensional effects.

Figure 14:
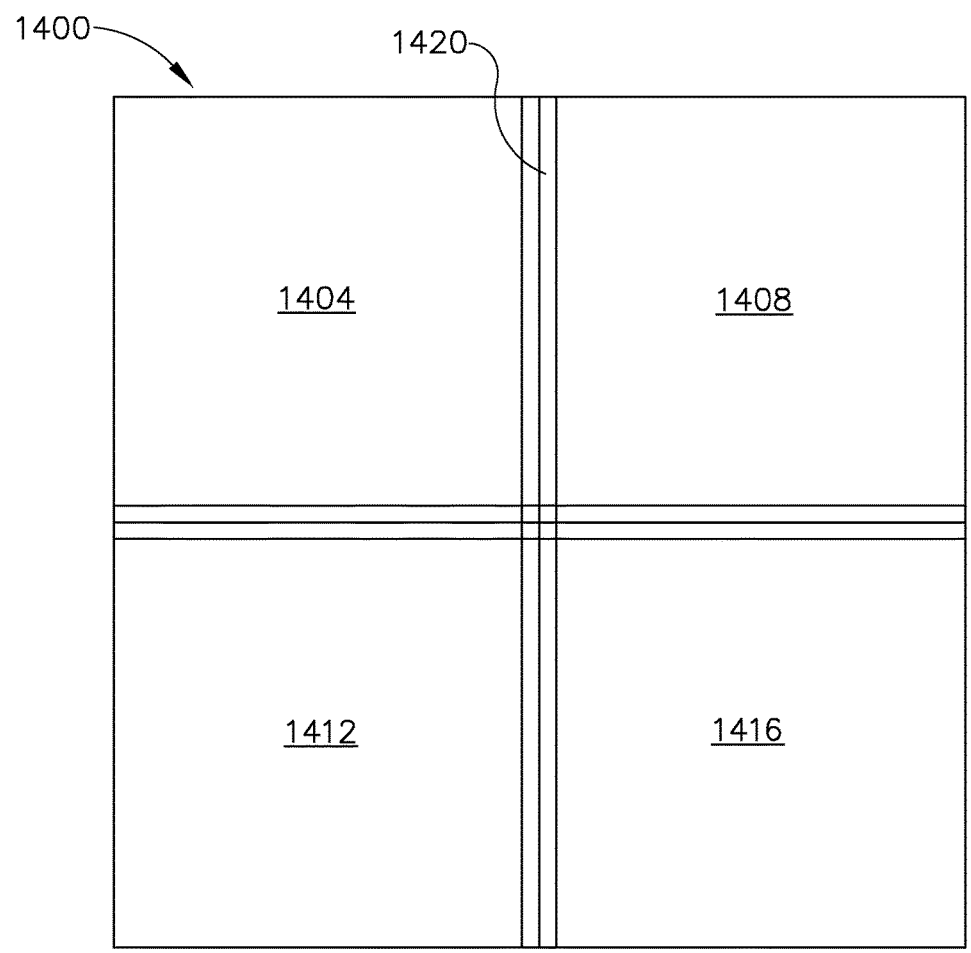
FIG. 14 is a perspective view of another embodiment of an electronic image receptor component comprising an array of four adjacent image receptor elements.

FIG. 14 illustrates yet another alternative embodiment of an electronic image receptor component indicated generally as 1400. Electronic image receptor component 1400 comprises an array of four adjacent image receptor elements indicated as 1404, 1408, 1412, and 1416. Image receptor elements 1404 through 1416 may be four separate image receptor elements, or may (similar to image receptor component 1200) comprise a single image receptor component divided into four image receptor sections or quadrants by, for example, a cross-shaped divider, indicated generally as 1420.

Figure 15:
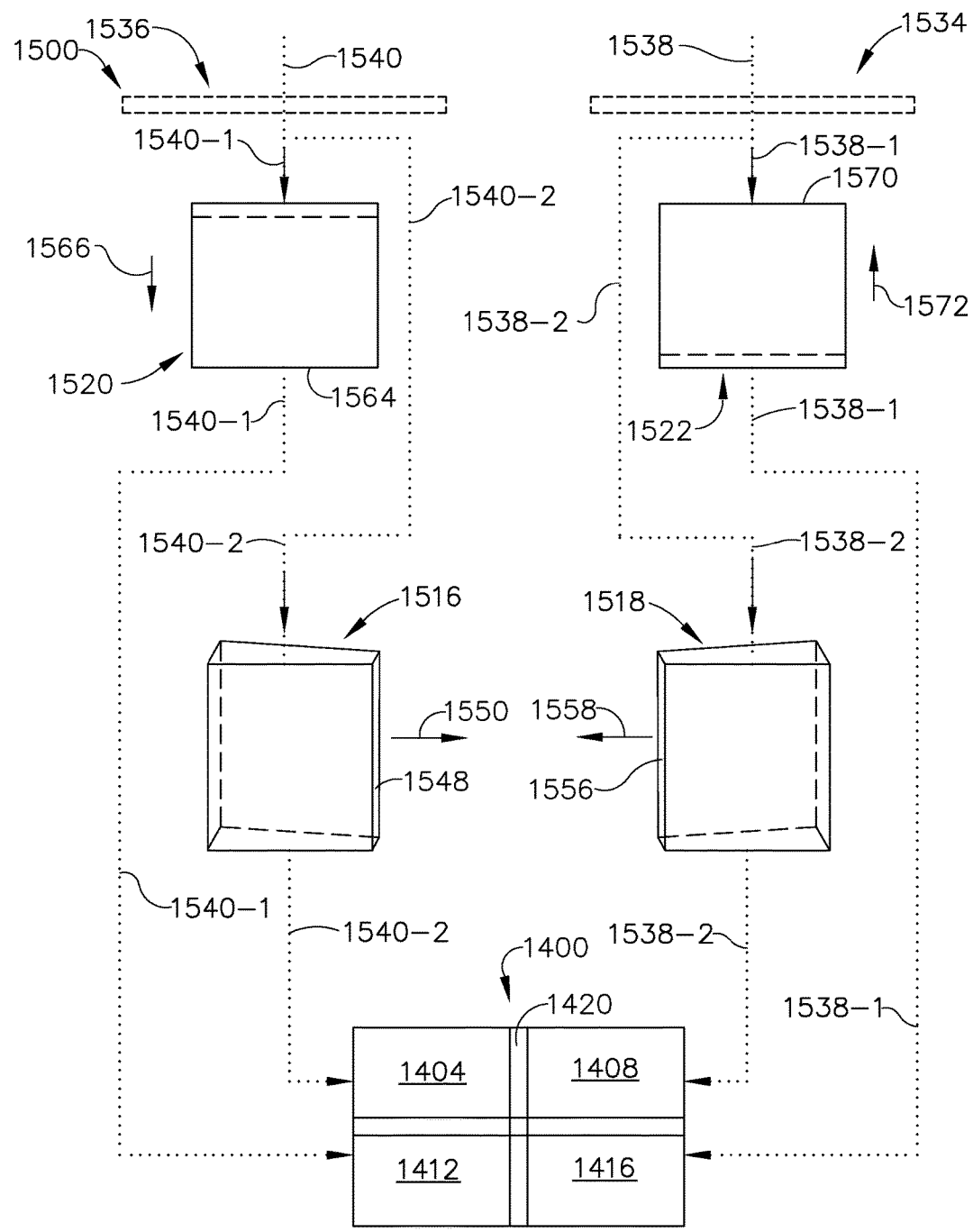
FIG. 15 is a schematic diagram of yet another embodiment of the device of the present invention using the embodiment of the electronic image receptor component shown in FIG. 14.

FIG. 15 is a schematic diagram of another embodiment of the device of the present invention using electronic image receptor component 1400 of FIG. 14 and indicated generally as 1500. As shown in FIG. 15, device 1500 also includes an optical wedge 1516 having apex 1548, an optical wedge 1518 having apex 1556), an optical wedge 1520 having apex 1564 positioned forward of optical wedge 1518, and an optical wedge 1522 having apex 1570.

As further shown in FIG. 15, after passing, respectively, through image area 1534 and image area 1536, image pathway 1540 is split into two image pathways, each comprising a plurality of such image paths but represented as one such image path by respective dotted arrows 1538-1 and 1538-2, while image pathway 1540 is split into two image pathways, each comprising a plurality of such image paths but represented as one such image path indicated by respective dotted arrows 1540-1 and 1540-2, i.e., a total of four image paths/pathways. Image path 1140-1 is shown as passing through optical wedge 1520 (having apex 1564) and being shifted downward, as indicated by arrow 1566, before being received by image receptor element/section/quadrant 1404. Image path 1140-2 is shown as passing through optical wedge 1516 (having apex 1548) and being shifted rightward, as indicated by arrow 1550, before being received by image receptor element/section/quadrant 1412. Image path 1538-1 is shown as passing through optical wedge 1522 (having apex 1570) and being shifted upward, as indicated by arrow 1572, before being received by image receptor element/section/quadrant 1416. Image path 1138-2 is shown as passing through optical wedge 1518 (having apex 1556) and being shifted leftward, as indicated by arrow 1558, before being received by image receptor element/section/quadrant 1408. Image receptor elements/sections/quadrants 1404 and 1408 operate alternately and intermittently (e.g., by alternately and intermittently turning elements/sections/quadrants 1404 and 1408 on and off) to receive rightward-shifted image pathway 1540-2 and leftward-shifted image path 1538-2. Similarly, image receptor elements/sections/quadrants 1412 and 1416 operate alternately and intermittently (e.g., by alternately and intermittently turning elements/sections/quadrants 1412 and 1416 on and off) to receive the downward-shifted image path 1540-1 and the upward-shifted image path 1538-1. The shifted image paths received by image receptor elements/sections/quadrants 1404 through 1416 may then be superimposed to form a coincident composite image having enhanced (3D) three-dimensional effects. For example, image receptor component 1400 which comprises elements/sections/quadrants 1404 through 1416 may be an electronic component of, for example, a video camera which converts the received shifted image paths/pathways as digital images (or as digital signals of such images), and which then superimposes those digital images (e.g., through the use of conventional hardware and/or software present in the video camera for recording and storing such digital images, as well as through the use of image receptor component 1400 which may also function to superimpose, record, and store these digital images) as a coincident composite image having enhanced (3D) three-dimensional effects. Similar to device 1100, in some embodiments of device 1500, either optical wedge 1516 or optical wedge 118 may be omitted, as well as either image receptor element/section/quadrant 1404 or image receptor image receptor element/section/quadrant 1408.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

In addition, the purpose of the Abstract of the Disclosure in this application is to enable the U.S. Patent and Trademark Office, as well as the public generally, including any scientists, engineers and practitioners in the art who may not be familiar with patent or other legal terms or phraseology to determine the what the technical disclosure of the application describes. Accordingly, while the Abstract of the Disclosure may be used to provide enablement for the following claims, it is not intended to be limiting as to the scope of those claims in any way.

Finally, it is the applicant's intent that only claims which include the express language "means for" or "step for" be interpreted under 35 U.S.C. § 112, paragraph 6. Accordingly, claims that do not expressly include the phrase "means for" or "step for" are not to be interpreted as being within the purview of 35 U.S.C. § 112, paragraph 6, or to be construed as being subject to any case law interpreting the meaning of these phrases.

What is claimed is:

1. A video camera which incorporates a device for creating three-dimensional image effects and which receives an image as two separate image pathways spaced apart along a horizontal axis, the device comprising:
an intermittent image pathway occluder which receives the two image pathways, and which alternately and intermittently occludes the two image pathways;
a horizontal imaging-shifting component for shifting at least one of the two image pathways leftward or rightward along a horizontal axis, and a comprising at least one horizontal image-shifting element which is positioned to receive and shift at least one of the two image pathways leftward or rightward;
a vertical imaging-shifting component for shifting the two image pathways upward and downward along a vertical axis, and comprising an upward image-shifting element and a downward image-shifting element, wherein the upward image-shifting element is positioned to receive and shift one of the two image pathways upward and wherein the downward image-shifting element is positioned to receive and shift the other of the two image pathways downward; and
an image pathway compositing component which forms a coincident superimposed composite three-dimensional image after the two image pathways have been shifted by the horizontal imaging-shifting component and the vertical imaging-shifting component, and after the two image pathways have been alternately and intermittently occluded by the intermittent image pathway occluder.

2. The video camera of claim 1, wherein the two image pathways are alternately and intermittently occluded by the intermittent image pathway occluder before being shifted by the horizontal imaging-shifting component and the vertical imaging-shifting component.

3. The video camera of claim 2, wherein the intermittent image pathway occluder comprises an intermittent optical shutter which receives the two image pathways and which alternately and intermittently blocks the passage of the two image pathways therethrough.

4. The video camera of claim 2, wherein the image pathway compositing component comprises:
a coincidence image pathway element which transmits and reflects image pathways and which is positioned to receive and to permit passage therethrough of one of the two image pathways after being shifted by one or both of the at least one horizontal imaging-shifting element and one of the vertical imaging-shifting elements; and
an image pathway reflector element positioned to receive and reflect the other of the two image pathways after being shifted by one or both of the at least one horizontal imaging-shifting element and the other of the vertical imaging-shifting elements;
wherein the image pathway reflector element reflects the other image pathway towards the coincidence image pathway element to form a coincident superimposed composite three-dimensional image with the one image pathway passing through the coincidence image pathway element.

5. The video camera of claim 1, wherein the intermittent image pathway occluder comprises an electronic occluder component which receives the two image pathways and which alternately and intermittently turns on and off to alternately and intermittently occlude the receipt of the two image pathways.

6. The video camera of claim 5, wherein the electronic occluder component comprises at least one electronic image receptor component.

7. The video camera of claim 5, wherein the electronic occluder component receives the two image pathways after the two image pathways have been shifted by the horizontal imaging-shifting component and the vertical imaging-shifting component.

8. The video camera of claim 6, wherein the at least one electronic image receptor component is one or more of: a charge-coupled device (CCD) sensor; a charge-coupled device (CCD) scanner; or an active-pixel sensor (APS).

9. The video camera of claim 6, wherein the at least one electronic image receptor component comprises a first and second image receptor element, wherein the first image receptor element receives one of the shifted image pathways, and wherein the second image receptor element receives the other of the image pathways, and wherein the two image receptor elements operate to alternately and intermittently receive each of the shifted image pathways.

10. The video camera of claim 1, wherein at least one horizontal image-shifting element comprises a leftward image-shifting element and a rightward image-shifting element.

11. The video camera of claim 10, wherein one of the leftward image-shifting and rightward image-shifting elements and one of the upward image-shifting and a downward image-shifting elements comprises a first compound optical wedge, and wherein the other of the leftward image-shifting and rightward image-shifting elements and the other of the upward image-shifting and a downward image-shifting elements comprise a second compound optical wedge.

12. The video camera of claim 1 which is a digital video camera.

13. A smartphone, a video game console, an e-reader, or an electronic tablet which incorporates the digital video camera of claim 12.

14. A device for creating and enhancing three-dimensional image effects and which receives an image as two separate image pathways spaced apart along a horizontal axis, the device being incorporated into a smartphone, an electronic tablet, a video game console, a digital video camera, or an e-reader, and comprising:
an intermittent optical image pathway occluder which receives the two image pathways, and which alternately and intermittently occludes passage of the two image pathways therethrough;
a first set of optical elements for shifting the two image pathways leftward and rightward along a horizontal optical axis after passing through the intermittent optical image pathway occluder, and comprising a leftward image-shifting optical element and rightward image-shifting optical element, wherein the leftward image-shifting optical element is positioned to receive and shift one of the two image pathways horizontally towards the left, and wherein the rightward image-shifting optical element is positioned to receive and shift the other of the two image pathways towards the right;
a second set of optical elements for shifting the two image pathways upward and downward along a vertical optical axis after passing through the intermittent optical image pathway occluder, and comprising an upward image-shifting optical element and downward image-shifting optical element, wherein the upward image-shifting optical element is positioned to receive and shift one of the two image pathways upward and wherein the downward image-shifting optical element is positioned to receive and shift the other of the two image pathways downward;

an angularly adjustable coincidence mirror positioned to receive one of the two image pathways after the image pathways are shifted by the first or second set of optical elements and having a forward reflective surface;

an angularly adjustable transmissive and reflective coincidence glass plate having a forward transmissive surface and a rearward reflective surface, and which is positioned so that the transmissive surface receives and passes the other of the two image pathways through the glass plate after the other image pathway is shifted by the first or second set of optical elements;

wherein the mirror and glass plate are angularly adjustable such that the forward reflective surface and the rearward reflective surface can be substantially parallel, and wherein when the forward and rearward reflective surfaces are substantially parallel, the image pathway received by the mirror is reflected by the forward reflective surface thereof towards the rearward reflective surface of the glass plate so as to form a coincident superimposed composite three-dimensional image from the image pathway reflected by the forward reflective surface and the image pathway passing through the glass plate.

15. The device of claim 14, wherein each of the optical elements comprise optical wedges having a rectangular-shaped apex and a rectangular-shaped base, and a pair of opposed inwardly slanted rectangular-shaped faces extending from the base to the apex.

16. The device of claim 15, wherein the apex of the first set of optical elements face inwardly towards each other.

17. The device of claim 15, wherein the apex of the first set of optical elements face outwardly away from each other.

18. The device of claim 15, wherein the first set optical elements are positioned forward of the second set of optical elements to first receive and shift the two image pathways.

19. The device of claim 15, wherein the second set of optical elements are positioned forward of the first set of optical elements to first receive and shift the two image pathways.

20. The device of claim 15, which further comprises a video camera and which has a lens for receiving the coincident superimposed composite three-dimensional image.

21. A device for at least creating three-dimensional image effects and which receives an image as at least three separate image pathways, the device comprising:
a first set of optical elements for shifting a first and/or second of the at least three image pathways leftward and/or rightward along a horizontal optical axis, and comprising a leftward image-shifting optical element and/or rightward image-shifting optical element, wherein the leftward image-shifting optical element is positioned to receive and shift the first image pathway leftward, and wherein the rightward image-shifting optical element is positioned to receive and shift the second image pathway rightward;
a second set of optical elements for shifting a third and fourth of the at least three image pathways upward and downward along a vertical optical axis, and comprising an upward image-shifting optical element and a downward image-shifting optical element, wherein the upward image-shifting optical element is positioned to receive and shift the third image pathway upward and wherein the downward image-shifting optical element is positioned to receive and shift the fourth image pathway downward;
at least one electronic image receptor component which is positioned to receive each of the shifted image pathways such that the at least one electronic image receptor component operates to alternately and intermittently occlude receipt of the third and fourth shifted image pathways, and, when receiving both the first and second shifted image pathways, operates to alternately and intermittently occlude receipt of the first and second shifted image pathways; and
an image pathway compositing component which forms a coincident superimposed composite three-dimensional image from the received first and/or second shifted image pathways, and the received third and fourth shifted image pathways.

22. The device of claim 21 which creates and enhances three-dimensional effects, and wherein there are four separate image pathways being shifted by the first set and second set of optical elements, wherein the at least one electronic image receptor component operates to alternately and intermittently receive the first and second shifted image pathways, and wherein the image pathway compositing component forms a coincident superimposed composite three-dimensional image from the received first, second, third and fourth shifted image pathways.

23. The device of claim 22, wherein the at least one electronic image receptor component comprises four image receptor elements, one of the four image receptor elements being positioned after each optical element of the first and second set of optical elements to receive the first, second, third, and fourth shifted image pathways.

24. The device of claim 22, wherein the at least one electronic image receptor component comprises an array of four image receptor elements, each image receptor element of the array being positioned to receive one of the first, second, third, and fourth shifted image pathways, wherein the image receptor elements receiving the first and second shifted image pathways operate to alternately and intermittently receive the first and second shifted image pathways, and wherein the image receptor elements receiving the third and fourth shifted image pathways operate to alternately and intermittently receive the third and fourth shifted image pathways.

25. The device of claim 22, wherein the at least one electronic image receptor component comprises a pair of electronic image receptor components, one of the pair of electronic receptor components comprising a first set of first and second image receptor elements, the other of the pair of electronic receptor components comprising a second set of third and fourth image receptor elements, the first and second image receptor elements of the first set each receiving one of the first and second shifted image pathways, the third and fourth image receptor elements of the second set each receiving one of the third and fourth shifted image pathways, wherein the first and second image receptor elements of the first set operate to alternately and intermittently receive the first and second shifted image pathways, and wherein the third and fourth image receptor elements of the second set operate to alternately and intermittently receive the third and fourth shifted image pathways.

26. The device of claim 21, wherein the at least one electronic image receptor component is one or more of: a charge-coupled device (CCD) sensor; a charge-coupled device (CCD) scanner; or an active-pixel sensor (APS).

27. The device of claim 21, wherein the image pathway compositing component comprises a digital video camera.

* * * * *